(12) United States Patent  
Zhang et al.

(10) Patent No.: US 11,909,953 B2  
(45) Date of Patent: Feb. 20, 2024

(54) REPRESENTATION OF AFFINE MODEL

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Hongbin Liu, Beijing (CN); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/193,397

(22) Filed: Mar. 5, 2021

(65) Prior Publication Data

US 2021/0211714 A1 Jul. 8, 2021

Related U.S. Application Data

(63) Continuation of application No. PCT/IB2019/058027, filed on Sep. 23, 2019.

(30) Foreign Application Priority Data

Sep. 23, 2018 (WO) ................ PCT/CN2018/107167

(51) Int. Cl.
  *H04N 19/513* (2014.01)
  *H04N 19/105* (2014.01)
  (Continued)

(52) U.S. Cl.
  CPC ......... *H04N 19/105* (2014.11); *H04N 19/137* (2014.11); *H04N 19/176* (2014.11);
  (Continued)

(58) Field of Classification Search
  CPC .......................... H04N 19/513; H04N 19/527
  See application file for complete search history.

(56) References Cited

U.S. PATENT DOCUMENTS 6,643,387 B1 * 11/2003 Sethuraman ........... G06V 20/46  
                                                        382/173  
9,877,043 B2 * 1/2018 He ........................ H04N 19/463  
(Continued)

FOREIGN PATENT DOCUMENTS

CN         106537915 A     3/2017  
CN         108271023 A     7/2018  
(Continued)

OTHER PUBLICATIONS

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

(Continued)

*Primary Examiner* — Shawn S An  
(74) *Attorney, Agent, or Firm* — Perkins Coie LLP

(57) ABSTRACT

A method, a video processing apparatus and computer-readable program medium for video process is disclosed. A method of video processing includes storing, during a conversion between a current block of video and a bitstream representation of the current block, affine model parameters for the current block; and performing the conversion using the affine model parameters, wherein the affine model parameters are derived at least from motion vectors of control points of the current block.

18 Claims, 19 Drawing Sheets

(51) Int. Cl.
*H04N 19/137* (2014.01)
*H04N 19/176* (2014.01)
*H04N 19/30* (2014.01)
*H04N 19/527* (2014.01)

(52) U.S. Cl.
CPC .......... *H04N 19/30* (2014.11); *H04N 19/513* (2014.11); *H04N 19/521* (2014.11); *H04N 19/527* (2014.11)

(56) References Cited

U.S. PATENT DOCUMENTS

| | | | |
|---|---|---|---|
| 10,448,010 | B2 | 10/2019 | Chen et al. |
| 10,560,712 | B2 | 2/2020 | Zou et al. |
| 10,757,417 | B2 | 8/2020 | Zhang et al. |
| 10,778,999 | B2 | 9/2020 | Li et al. |
| 10,841,609 | B1 | 11/2020 | Liu et al. |
| 2005/0265453 | A1 | 12/2005 | Saito |
| 2005/0276323 | A1* | 12/2005 | Martemyanov ...... H04N 19/176 375/240.03 |
| 2006/0268166 | A1 | 11/2006 | Bossen et al. |
| 2016/0050430 | A1 | 2/2016 | Xiu et al. |
| 2017/0332095 | A1* | 11/2017 | Zou ................ H04N 19/513 |
| 2018/0041769 | A1* | 2/2018 | Chuang ............ H04N 19/573 |
| 2018/0098063 | A1 | 4/2018 | Chen et al. |
| 2018/0192069 | A1 | 7/2018 | Chen et al. |
| 2018/0359483 | A1* | 12/2018 | Chen ................ H04N 19/70 |
| 2019/0028731 | A1 | 1/2019 | Chuang et al. |
| 2019/0037231 | A1 | 1/2019 | Ikai et al. |
| 2019/0116376 | A1* | 4/2019 | Chen ................ H04N 19/70 |
| 2019/0230361 | A1 | 7/2019 | Zhang et al. |
| 2019/0327482 | A1* | 10/2019 | Lin ................. H04N 19/117 |
| 2019/0387250 | A1* | 12/2019 | Boyce ................ H04N 19/52 |
| 2020/0021840 | A1* | 1/2020 | Xu .................. H04N 19/44 |
| 2020/0029089 | A1 | 1/2020 | Xu et al. |
| 2020/0036997 | A1 | 1/2020 | Li et al. |
| 2020/0045310 | A1 | 2/2020 | Chen et al. |
| 2020/0077113 | A1* | 3/2020 | Huang .............. H04N 19/55 |
| 2020/0145688 | A1 | 5/2020 | Zou et al. |
| 2020/0213594 | A1 | 7/2020 | Liu et al. |
| 2020/0213612 | A1 | 7/2020 | Liu et al. |
| 2020/0221120 | A1* | 7/2020 | Robert .............. H04N 19/182 |
| 2020/0228817 | A1 | 7/2020 | Li et al. |
| 2020/0359029 | A1 | 11/2020 | Liu et al. |
| 2020/0374549 | A1 | 11/2020 | Li et al. |
| 2020/0382771 | A1 | 12/2020 | Liu et al. |
| 2020/0382795 | A1 | 12/2020 | Zhang et al. |
| 2020/0396453 | A1 | 12/2020 | Zhang et al. |
| 2020/0396465 | A1 | 12/2020 | Zhang et al. |
| 2021/0168398 | A1 | 6/2021 | Ahn |
| 2021/0195177 | A1 | 6/2021 | Zhang et al. |
| 2021/0203943 | A1 | 7/2021 | Lin et al. |
| 2021/0211646 | A1 | 7/2021 | Lee |
| 2021/0243467 | A1 | 8/2021 | Zhang et al. |
| 2021/0243468 | A1 | 8/2021 | Zhang et al. |
| 2021/0352315 | A1* | 11/2021 | Zhang ................ H04N 19/52 |

FOREIGN PATENT DOCUMENTS

| | | |
|---|---|---|
| CN | 108432250 A | 8/2018 |
| EP | 3422720 A1 | 1/2019 |
| KR | 20180059286 A | 6/2018 |
| TW | 201742465 A | 12/2017 |
| WO | 2002037859 A2 | 5/2002 |
| WO | 2011013253 A1 | 2/2011 |
| WO | 2017148345 A1 | 9/2017 |
| WO | 2017157259 A1 | 9/2017 |
| WO | 2017200771 A1 | 11/2017 |
| WO | 2018061563 A1 | 4/2018 |
| WO | 2018067823 A1 | 4/2018 |
| WO | 2018126163 A1 | 7/2018 |
| WO | 2019231362 A1 | 12/2019 |

OTHER PUBLICATIONS

Chen et al. "CE4: Affine Merge Enhancement (Test 2.10)," Joint Video Experts Team (JVET) of ITU-T SG 16 WP 3 and ISO/IEC JTC 1/SC 29/WG 11 11th Meeting, Ljubljana, SI, Jul. 10-18, 2018, document JVET-K0186, 2018.

JEM-7.0: https://jvet.hhi.fraunhofer.de/svn/svn_HMJEMSoftware/tags/ HM-16.6-JEM-7.0.

Huang et al. "Control-Point Representation and Differential Coding Affine-Motion Compensaiton," IEEE Transactions on Circuits and Systems for Video Technology, Oct. 23, 2013 (10):1651-1660.

"ITU-T H.265 ""High efficiency video coding"" Series H: Audiovisual and Multimedia SYSTEMSInfrastructure of audiovisual services—Coding of movingvideo, Telecommunicationstandardization Sectorof ITU, Available at address: https://www.itu.int/rec/T-REC-H.265 (Nov. 2019)."

Iwamura et al. "CE4-2.11: MVPlanar Prediction," Joint Video Experts Team (JVET) of ITU-T Sg 16 WP 3 and ISO/IEC JTC 1/SC 29/WG 11 11th Meeting, Ljubljana, SI, Jul. 10-18, 20018, document JVET-K0349, 2018.

Xiu et al. "CE4.2.5: Simplification on Advanced Temporal Motion Vector Prediction (ATMVP)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0341, 2018.

Zhang et al. "CE4-Related: Interweaved Prediction for Affine Motion Compensation," Joint Video Experts Team (JVET) of ITU-T SG 16 WP 3 and ISO/IEC JTC 1/SC 29/WG 11, 11th Meeting, Ljubljana, SI, Jul. 10-18, 2018. document JVET-K0102, 2018.

Zhang et al. "CE4-Related: History-based Motion Vector Prediction," Joint Video Experts Team (JVET) of ITU-T SG WP 3 and ISO/IEC JTC 1/SC 29/WG 11, 11th Meeting: Ljubljana, SI, Jul. 10-1, 2018, document JVET-K0104, 2018.

Zhang et al. "CE2-Related: An Alternative Storing Method for Affine Inheritance," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0270, 2019.

Zhou et al. "Non-CE4: A Study on the Affine Merge Mode," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0052, 2018.

International Search Report and Written Opinion from International Patent Application No. PCT/IB2019/058027 dated Feb. 10, 2020 (20 pages).

International Search Report and Written Opinion from International Patent Application No. PCT/IB2019/058028 dated Dec. 18, 2019 (15 pages).

Chen et al. "AHG5: Reducing VVC Worst-Case Memory Bandwidth by Restricting Bi-Directional 4+4 Inter Cus/Sub-Blocks," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0104, 2018.

Chen et al. "CE4: Common Base for Affine Merge Mode (Test 4.2.1)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0366, 2018.

Gao et al. "CE4-Related: Sub-Block MV Clipping in Affine Prediction," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0317, 2018.

Hsiao et al. "CE4.4.12: Pairwise Average Candidates," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0090, 2018.

Li et al. "AHG5: Reduction of Worst Case Memory Bandwidth," Joint Video Exploration Team (JVET) of ITU-T SG 16 WP 3 and ISO/IEC JTC 1/SC 29/WG 11, 12th Meeting, Macao, CN, Oct. 3-12, 2018, document JVT-L0122, 2018.

Van et al. "CE4-Related: Affine Restrictions for the Worst-Case Bandwidth Reduction," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0396, 2018.

Yang et al. "Description of Core Experiment 4 (CE4): Inter Prediction and Motion Vector Coding," Joint Video Experts Team

(56) References Cited

OTHER PUBLICATIONS (JVET) of ITU-T SG 16 WP 3 and ISO/IEC JTC 1/SC 29/WG 11, 11th Meeting, Ljubljana, SI, Jul. 10-18, 2018, document JVE-K1024, 2018.

Yang et al. "CE4-Related: Control Point MV Offset for Affine Merge Mode," Joint Video Experts Team (JVET) of ITU-T SG 16 WP 3 and ISO/IEC JTC 1/SC 29/WG 11, 12th Meeting, Macao, CN, Oct. 3-12, 2018, document JVET-0389, 2018.

Zhang et al. "CE4: Affine Prediction with 4+4 Sub-Blocks for Chroma Componets (Test 4.1.16)," Joint Video Exports Team (JVET) of ITU-T SG 16 WP3 and ISO/IEC JTC 1/SC 29/WG 11, 12th Meeting, Macao, CN, Oct. 3-12, 2018, documet JVET-L0265, 2018.

Zhou et al. "CE4-Related: A Clean Up for Affine Mode," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0047, 2018.

H.265/HEVC, https://www.itu.int/rec/T-REC-H.265.

VTM-2.0.1: https://vcgit.hhi.fraunhofer.de/jvet/VVCSoftware_VTM/tags/VTM-2.0.1.

International Search Report and Written Opinion from International Patent Application No. PCT/IB2019/058991 dated Jan. 23, 2020 (16 pages).

International Search Report and Written Opinion from International Patent Application No. PCT/IB2019/058993 dated Jan. 23, 2020 (17 pages).

Non-Final Office Action from U.S. Appl. No. 17/237,450 dated Sep. 2, 2021.

Final Office Action from U.S. Appl. No. 17/237,450 dated Feb. 24, 2022.

Non-Final Office Action from U.S. Appl. No. 17/237,402 dated Apr. 27, 2022.

Non-Final Office Action from U.S. Appl. No. 17/237,450 dated Jun. 9, 2022.

Chen et al. "CE4: Affine Merge Enhancement (Test 4.2.2)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0368, 2018.

Non-Final Office Action from U.S. Appl. No. 17/193,425 dated Aug. 18, 2022.

Notice of Allowance from U.S. Appl. No. 17/237,402 dated May 17, 2023.

Non-Final Office Action from U.S. Appl. No. 17/237,450 dated Mar. 27, 2023.

Final Office Action from U.S. Appl. No. 17/237,450 dated Oct. 6, 2022.

Final Office Action from U.S. Appl. No. 17/237,402 dated Oct. 13, 2022.

* cited by examiner

REPRESENTATION OF AFFINE MODEL

CROSS-REFERENCE TO RELATED APPLICATION

This application is a continuation of International Application No. PCT/IB2019/058027, filed on Sep. 23, 2019, which claims the priority to and benefits of International Patent Application No. PCT/CN2018/107167, filed on Sep. 23, 2018. All the aforementioned patent applications are hereby incorporated by reference in their entireties.

TECHNICAL FIELD

This patent document relates to video coding techniques, devices and systems.

BACKGROUND

Motion compensation (MC) is a technique in video processing to predict a frame in a video, given the previous and/or future frames by accounting for motion of the camera and/or objects in the video. Motion compensation can be used in the encoding of video data for video compression.

SUMMARY

This document discloses methods, systems, and devices related to the use of affine motion compensation in video coding and decoding.

In one example aspect, a method of video processing is disclosed. The method includes storing, during a conversion between a current block of video and a bitstream representation of the current block, affine model parameters for the current block, and performing the conversion using the affine model parameters.

In another example aspect, a method of video processing is disclosed. The method includes deriving, during a conversion between a current block of video and a bitstream representation of the current block, a new affine model for the current block using control point motion vectors (CPMVs) of original affine models, and performing the conversion using the new affine model.

In another example aspect, a method of video processing is disclosed. The method includes using, during a conversion between a current block of video and a bitstream representation of the current block, a combination prediction from N1 affine predictions and N2 non-affine predictions, wherein N1 and N2 are integers, and performing the conversion using the combination prediction.

In another example aspect, a method of video processing is disclosed. The method includes using, during a conversion between a current block of video and a bitstream representation of the current block, a sub-block based merge list for the current block, and performing the conversion using the sub-block based merge list.

In another example aspect, a method of video processing is disclosed. The method includes storing, during a conversion between a current block of video and a bitstream representation of the current block, affine model parameters for the current block; and performing the conversion using the affine model parameters, wherein the affine model parameters are derived at least from motion vectors of control points of the current block.

In another example aspect, a method of video processing is disclosed. The method includes signaling, during a conversion between a current block of video and a bitstream representation of the current block, affine model parameters for the current block; and performing the conversion using the affine model parameters, wherein the affine model parameters are derived at least from motion vectors of control points of the current block.

In another example aspect, a method of video processing is disclosed. The method includes deriving, during a conversion between a current block of video and a bitstream representation of the current block, a combined affine model using multiple original affine models with parameters; and performing the conversion by using the combined affine model, wherein the affine model parameters are derived at least from motion vectors of control points of the current block.

In another example aspect, a method of video processing is disclosed. The method includes deriving, during a conversion between a current block of video and a bitstream representation of the current block, a new affine model using multiple original affine models with control point motion vectors; and performing the conversion by using the new affine model.

In another example aspect, a method of video processing is disclosed. The method includes deriving, during a conversion between a current block of video and a bitstream representation of the current block, a final combined prediction for the current block by combining multiple temporary predictions for the current block; and performing the conversion by using the final combined prediction.

In another example aspect, a method of video processing is disclosed. The method includes deriving, during a conversion between a current block of video and a bitstream representation of the current block, multiple combined affine models for the current block; and performing the conversion by using the multiple combined affine models.

In yet another representative aspect, the various techniques described herein may be embodied as a computer program product stored on a non-transitory computer readable media. The computer program product includes program code for carrying out the methods described herein.

In yet another representative aspect, a video decoder apparatus may implement a method as described herein.

In yet another aspect, a video encoder apparatus comprising a processor is disclosed. The video encoder apparatus implements a method described herein.

The details of one or more implementations are set forth in the accompanying attachments, the drawings, and the description below. Other features will be apparent from the description and drawings, and from the claims.

DETAILED DESCRIPTION

The present document provides several techniques that can be embodied into digital video encoders and decoders. Section headings are used in the present document for clarity of understanding and do not limit scope of the techniques and embodiments disclosed in each section only to that section.

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding (VVC) standard to be finalized, or other current and/or future video coding standards.

1. Summary

This invention is related to video/image coding technologies. Specifically, it is related to affine prediction in video/image coding. It may be applied to the existing video coding standard like HEVC, or the standard (Versatile Video Coding) to be finalized. It may be also applicable to future video/image coding standards or video/image codec.

2. Introduction

Figure 1:
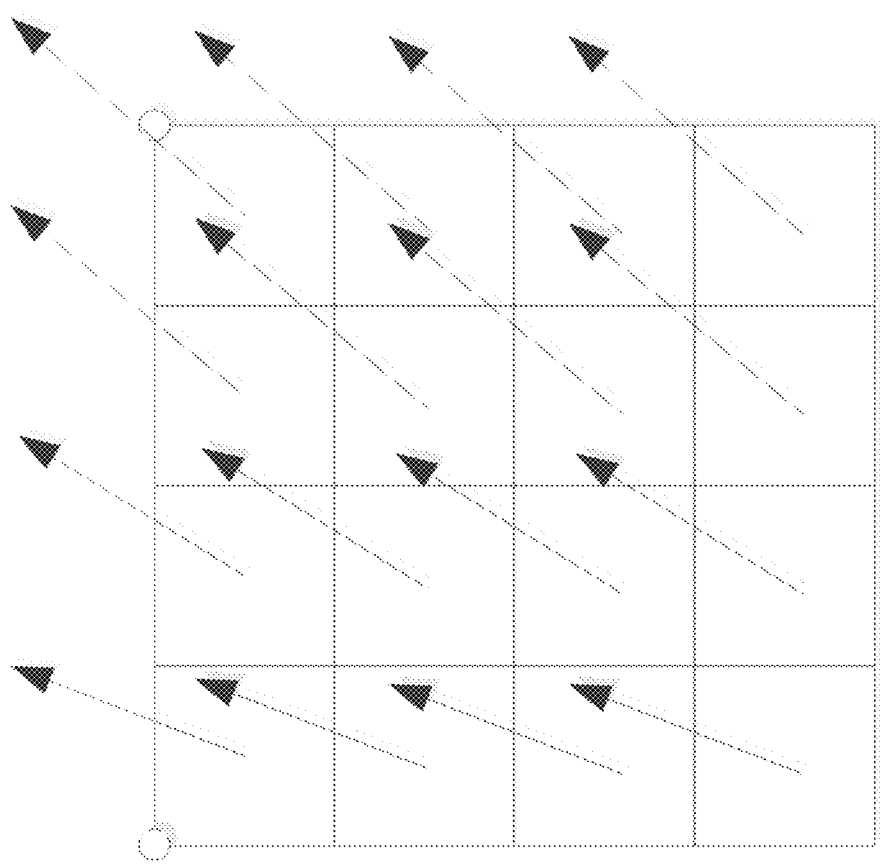
FIG. 1 shows an example of sub-block based prediction calculation.

Sub-block based prediction is first introduced into the video coding standard by HEVC Annex I (3D-HEVC). With sub-block based prediction, a block, such as a Coding Unit (CU) or a Prediction Unit (PU), is divided into several non-overlapped sub-blocks. Different sub-block may be assigned different motion information, such as reference index or Motion Vector (MV), and Motion Compensation (MC) is performed individually for each sub-block. FIG. 1 shows the concept of sub-block based prediction.

To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM).

In JEM, sub-block based prediction is adopted in several coding tools, such as affine prediction, Alternative temporal motion vector prediction (ATMVP), spatial-temporal motion vector prediction (STMVP), Bi-directional Optical flow (BIO) and Frame-Rate Up Conversion (FRUC). Affine prediction has also been adopted into VVC.

2.1 Examples of Affine Prediction

Figure 2A:
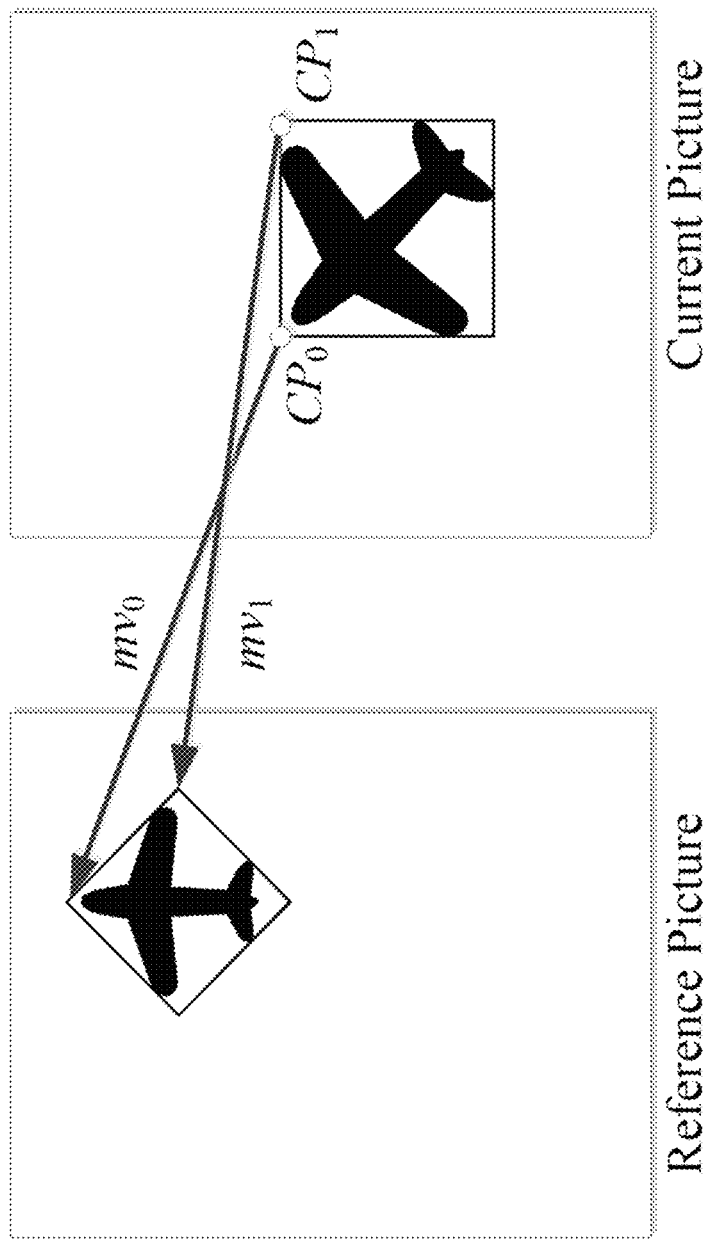
FIG. 2A-2B shows examples of Simplified affine motion model. 2A: 4-parameter affine model; 2B: 6-parameter affine model.
Figure 2B:
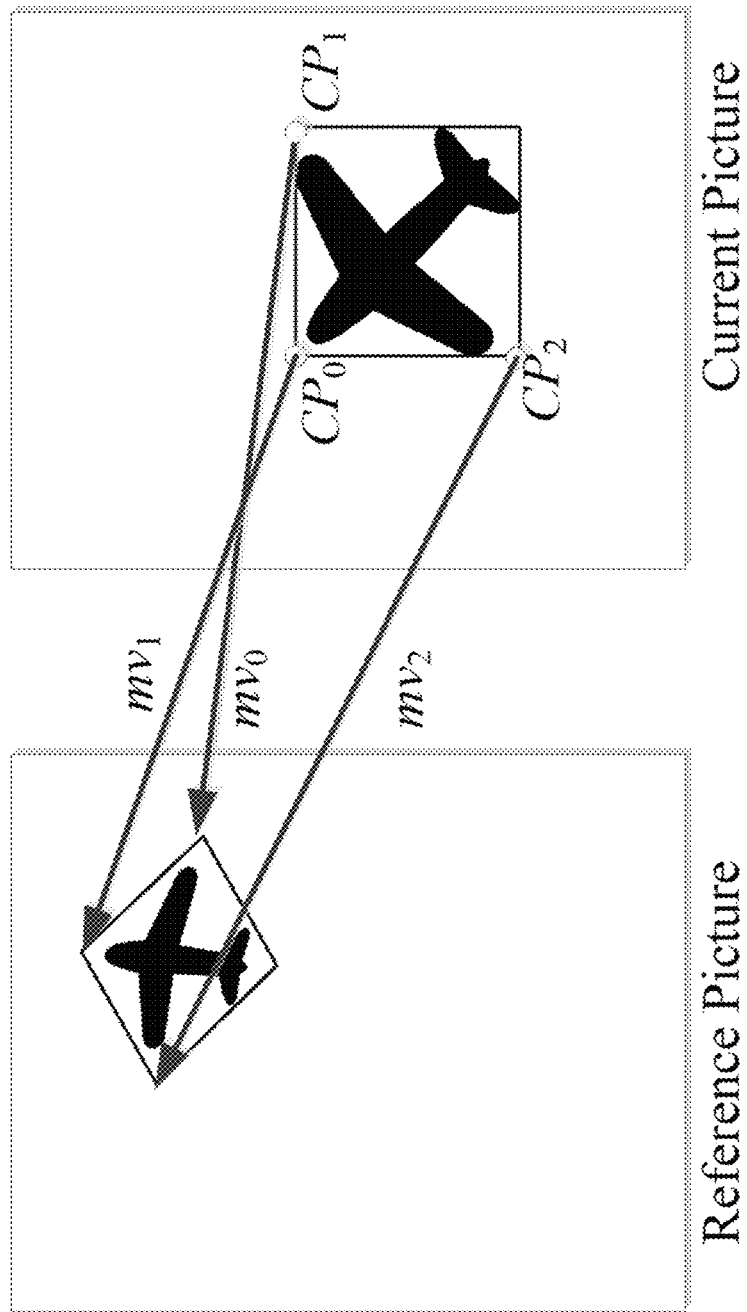

In HEVC, only translation motion model is applied for motion compensation prediction (MCP). While in the real world, there are many kinds of motion, e.g. zoom in/out, rotation, perspective motions and the other irregular motions. In the VVC, a simplified affine transform motion compensation prediction is applied. As shown in FIG. 2, the affine motion field of the block is described by two (in the 4-parameter affine model) or three (in the 6-parameter affine model) control point motion vectors.

FIG. 2 shows a simplified affine motion model. (a) 4-parameter affine model; (b) 6-parameter affine model The motion vector field (MVF) of a block is described by the following equation with the 4-parameter affine model $$\begin{cases} mv^h(x, y) = \frac{(mv_1^h - mv_0^h)}{w}x - \frac{(mv_1^v - mv_0^v)}{w}y + mv_0^h \\ mv^v(x, y) = \frac{(mv_1^v - mv_0^v)}{w}x + \frac{(mv_1^h - mv_0^h)}{w}y + mv_0^v \end{cases} \quad (1)$$

and 6-parameter affine model:

$$\begin{cases} mv^h(x, y) = \frac{(mv_1^h - mv_0^h)}{w}x + \frac{(mv_2^h - mv_0^h)}{h}y + mv_0^h \\ mv^v(x, y) = \frac{(mv_1^v - mv_0^v)}{w}x + \frac{(mv_2^v - mv_0^v)}{h}y + mv_0^v \end{cases} \quad (2)$$

where $(mv^h_0, mv^h_0)$ is motion vector of the top-left corner control point, and $(mv^h_1, mv^h_1)$ is motion vector of the top-right corner control point and $(mv^h_2, mv^h_2)$ is motion vector of the bottom-left corner control point.

Figure 3:
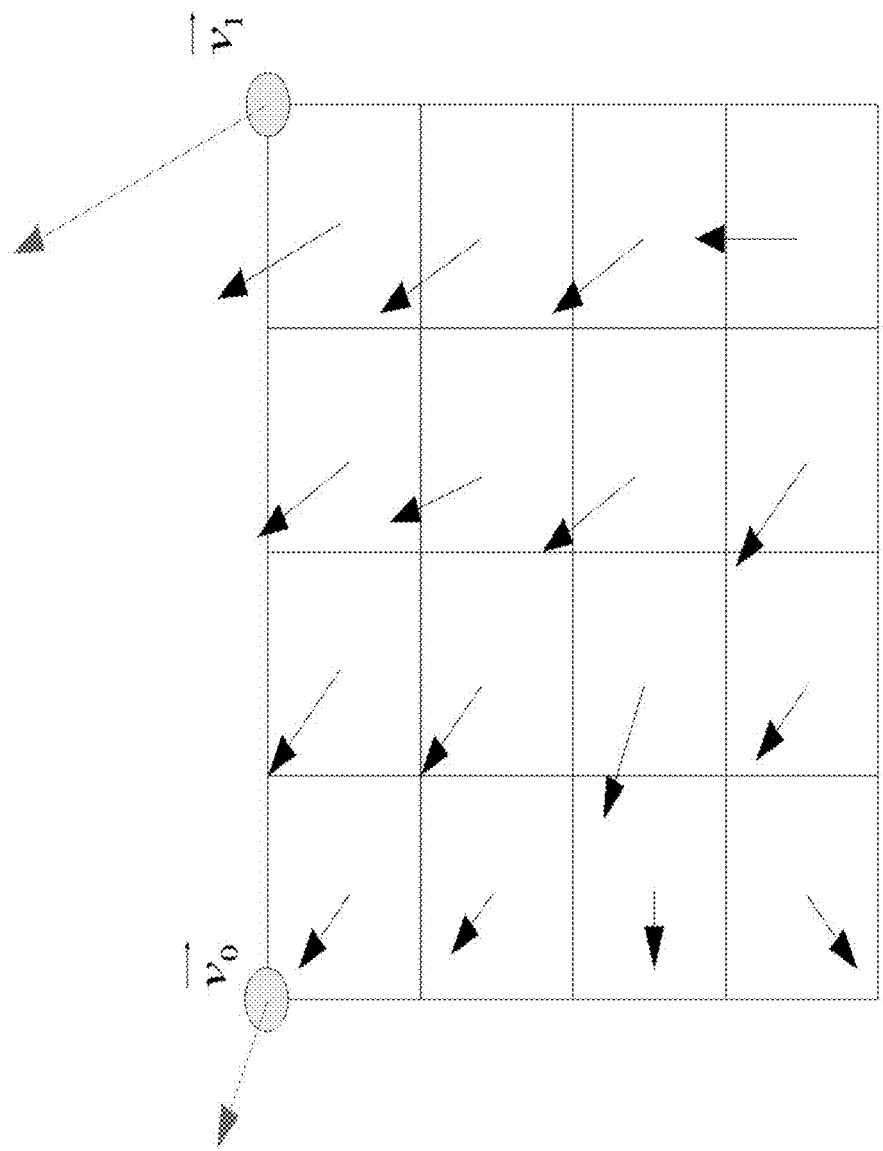
FIG. 3 shows an example of affine motion vector field (MVF) per subblock.

To derive motion vector of each 4×4 sub-block, the motion vector of the center sample of each sub-block, as shown in FIG. 3, is calculated according to Eq. (1) or (2), and rounded to 1/16 fraction accuracy. Then the motion compensation interpolation filters are applied to generate the prediction of each sub-block with derived motion vector.

In VVC Test model (VTM), there are two affine motion modes: AF_INTER mode and AF_MERGE mode. For CUs with both width and height larger than 8, AF_INTER mode can be applied. An affine flag in CU level is signalled in the bitstream to indicate whether AF_INTER mode is used. In this mode, a CP MVP candidate list with two candidates is constructed.

Figure 4A:
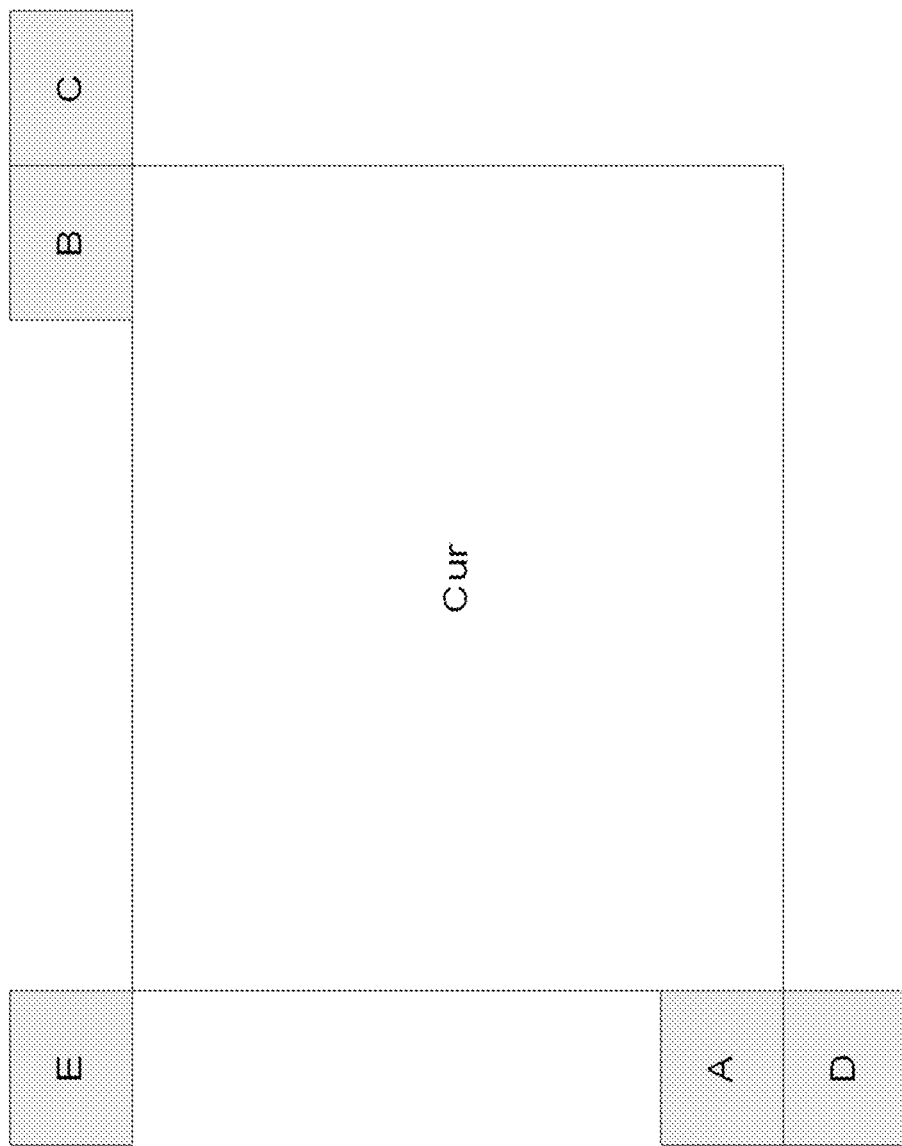
FIGS. 4A-4B show candidates for AF_MERGE mode.
Figure 4B:
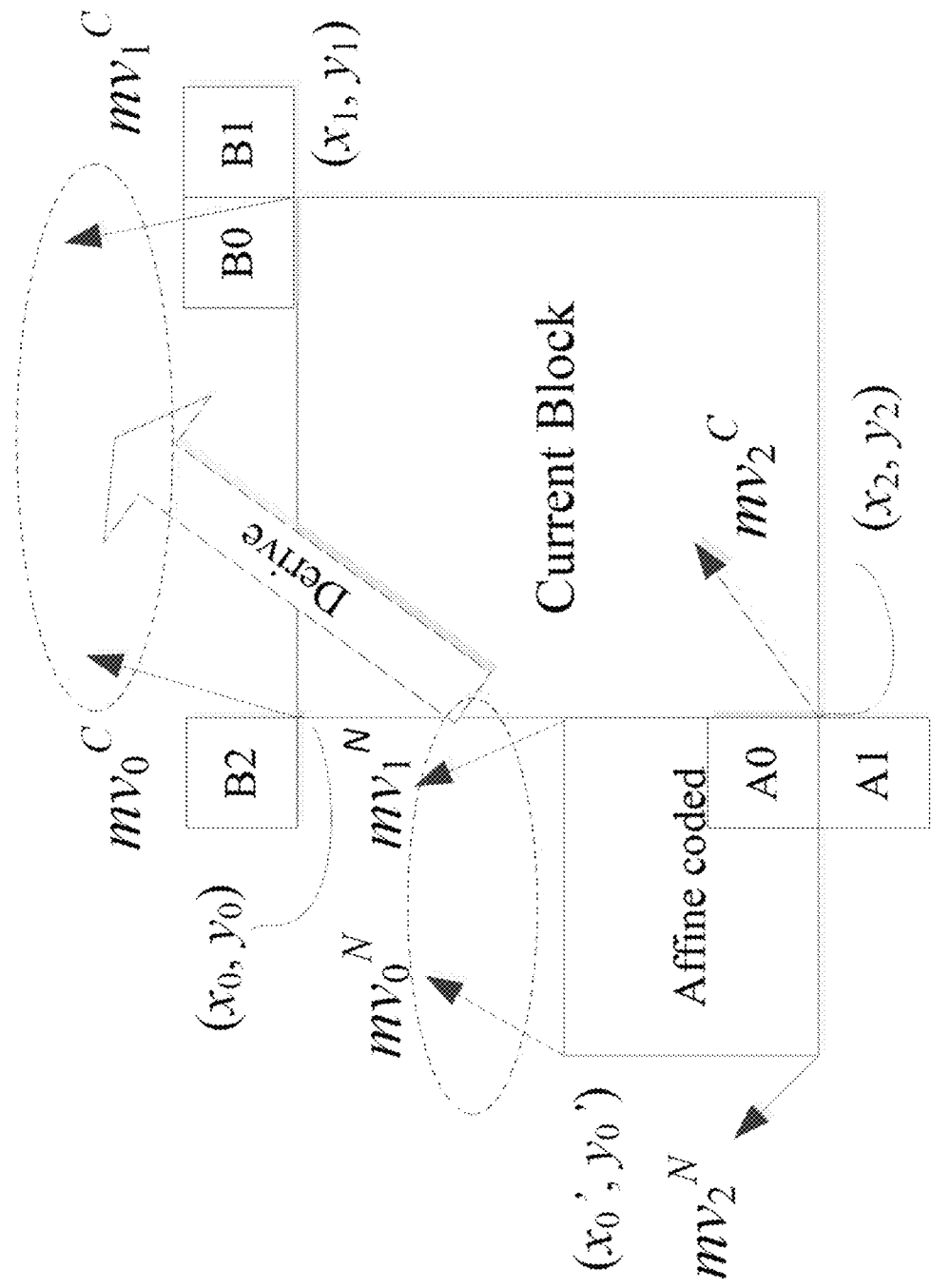

Affine model can be inherited from spatial neighbouring affine-coded block such as left, above, above right, left bottom and above left neighbouring block as shown in FIG. 4A. For example, if the neighbour left bottom block A in FIG. 4A is coded in affine mode as denoted by A0 in FIG. 4B., the Control Point (CP) motion vectors $mv_0^N$, $mv_1^N$ and $mv_2^N$ of the top left corner, above right corner and left bottom corner of the neighbouring CU/PU which contains the block A are fetched. And the motion vector $mv_0^C$, $mv_1^C$ and $mv_2^C$ (which is only used for the 6-parameter affine model) of the top left corner/top right/bottom left on the current CU/PU is calculated based on $mv_0^N$, $mv_1^N$ and $mv_2^N$.

It should be noted that when a CU is coded with affine merge mode, i.e., in AF_MERGE mode, it gets the first block coded with affine mode from the valid neighbour reconstructed blocks. And the selection order for the candidate block is from left, above, above right, left bottom to above left as shown FIG. 4A.

The derived CP MVs $mv_0^C$, $mv_1^C$ and $mv_2^C$ of current block can be used as CP MVs in the affine merge mode. Or they can be used as MVP for affine inter mode in VVC. It should be noted that for the merge mode, if the current block is coded with affine mode, after deriving CP MVs of current block, the current block may be further split into multiple sub-blocks and each block will derive its motion information based on the derived CP MVs of current block.

Figure 5:
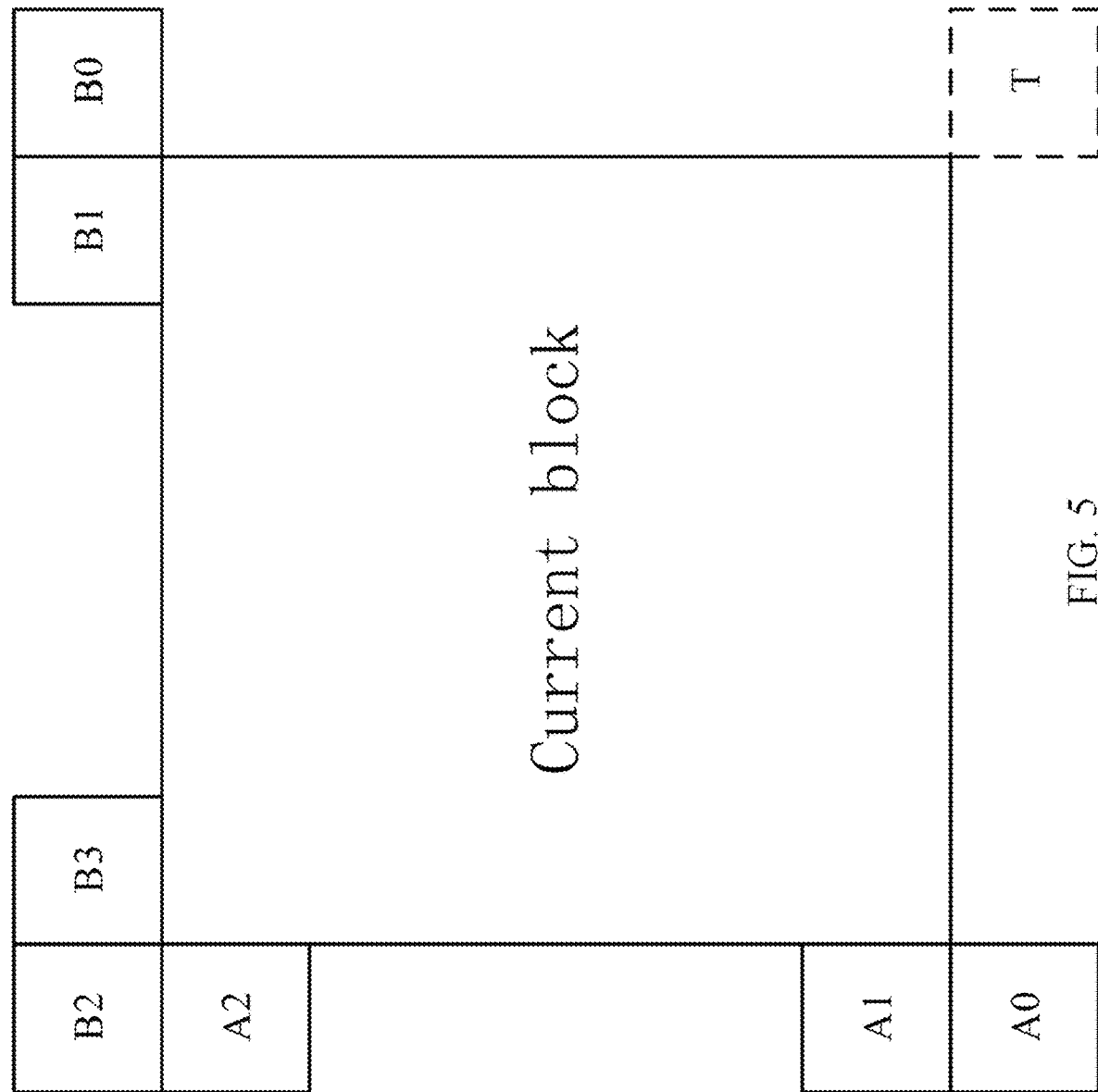
FIG. 5 shows example candidate positions for affine merge mode.

Different from VTM wherein only one affine spatial neighboring block may be used to derive affine motion for a block, in other embodiments, it proposes to construct a separate list of affine candidates for the AF_MERGE mode.
1) Insert Inherited Affine Candidates into Candidate List FIG. 5 shows examples of candidate position for affine merge mode.

Inherited affine candidate means that the candidate is derived from the valid neighbor reconstructed block coded with affine mode.

As shown in FIG. 5, the scan order for the candidate block is $A_1$, $B_1$, $B_0$, $A_0$ and $B_2$. When a block is selected (e.g., $A_1$), the two-step procedure is applied:
 a) First, use the three corner motion vectors of the CU covering the block to derive two/three control points of current block
 b) Based on the control points of current block to derive sub-block motion for each sub-block within current block 2) Insert Constructed Affine Candidates If the number of candidates in affine merge candidate list is less than MaxNumAffineCand, constructed affine candidates are insert into the candidate list.

Constructed affine candidate means the candidate is constructed by combining the neighbor motion information of each control point.

The motion information for the control points is derived firstly from the specified spatial neighbors and temporal neighbor shown in FIG. 5. CPk (k=1, 2, 3, 4) represents the k-th control point. $A_0$, $A_1$, $A_2$, $B_0$, $B_1$, $B_2$ and $B_3$ are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

The motion information of each control point is obtained according to the following priority order:
For CP1, the checking priority is $B_2 \rightarrow B_3 \rightarrow A_2$. $B_2$ is used if it is available. Otherwise, if $B_2$ is available, $B_3$ is used. If both $B_2$ and $B_3$ are unavailable, $A_2$ is used. If all the three candidates are unavailable, the motion information of CP1 cannot be obtained.
For CP2, the checking priority is $B_1 \rightarrow B_0$;
For CP3, the checking priority is $A_1 \rightarrow A_0$;
For CP4, T is used.

Second, the combinations of controls points are used to construct the motion model.

Motion vectors of three control points are needed to compute the transform parameters in 6-parameter affine model. The three control points can be selected from one of the following four combinations ({CP1, CP2, CP4}, {CP1, CP2, CP3}, {CP2, CP3, CP4}, {CP1, CP3, CP4}). For example, use CP1, CP2 and CP3 control points to construct 6-parameter affine motion model, denoted as Affine (CP1, CP2, CP3).

Motion vectors of two control points are needed to compute the transform parameters in 4-parameter affine model. The two control points can be selected from one of the following six combinations ({CP1, CP4}, {CP2, CP3}, {CP1, CP2}, {CP2, CP4}, {CP1, CP3}, {CP3, CP4}). For example, use the CP1 and CP2 control points to construct 4-parameter affine motion model, denoted as Affine (CP1, CP2).

The combinations of constructed affine candidates are inserted into to candidate list as following order:
 {CP1, CP2, CP3}, {CP1, CP2, CP4}, {CP1, CP3, CP4}, {CP2, CP3, CP4}, {CP1, CP2}, {CP1, CP3}, {CP2, CP3}, {CP1, CP4}, {CP2, CP4}, {CP3, CP4}

3) Insert Zero Motion Vectors

If the number of candidates in affine merge candidate list is less than MaxNumAffineCand, zero motion vectors are insert into the candidate list, until the list is full.

2.2 Examples of ATMVP (Advanced Temporal Motion Vector Prediction)

At the 10th JVET meeting, advanced temporal motion vector prediction (ATMVP) was included in the benchmark set (BMS)-1.0 reference software, which derives multiple motion for sub-blocks of one coding unit (CU) based on the motion information of the collocated blocks from temporal neighboring pictures. Although it improves the efficiency of temporal motion vector prediction, the following complexity issues are identified for the existing ATMVP design:
 The collocated pictures of different ATMVP CUs may not be the same if multiple reference pictures are used. This means the motion fields of multiple reference pictures need to be fetched.
 The motion information of each ATMVP CU is always derived based on 4×4 units, resulting in multiple invocations of motion derivation and motion compensation for each 4×4 sub-block inside one ATMVP CU.

Some further simplifications on ATMVP were proposed and have been adopted in VTM2.0.
2.2.1 Examples of Simplified Collocated Block Derivation with One Fixed Collocated Picture In this method, one simplified design is proposed to use the same collocated picture as in HEVC, which is signaled at the slice header, as the collocated picture for ATMVP derivation. At the block level, if the reference picture of a neighboring block is different from this collocated picture, the MV of the block is scaled using the HEVC temporal MV scaling method, and the scaled MV is used in ATMVP.

Denote the motion vector used to fetch the motion field in the collocated picture $R_{col}$ as $MV_{col}$. To minimize the impact due to MV scaling, the MV in the spatial candidate list used to derive $MV_{col}$ is selected in the following way: if the reference picture of a candidate MV is the collocated picture, this MV is selected and used as $MV_{col}$ without any scaling. Otherwise, the MV having a reference picture closest to the collocated picture is selected to derive $MV_{col}$ with scaling.

2.2.2 Examples of Adaptive ATMVP Sub-Block Size

In this method, it is proposed to support the slice-level adaptation of the sub-block size for the ATMVP motion derivation. Specifically, one default sub-block size that is used for the ATMVP motion derivation is signaled at sequence level. Additionally, one flag is signaled at slice-level to indicate if the default sub-block size is used for the current slice. If the flag is false, the corresponding ATMVP sub-block size is further signaled in the slice header for the slice.

2.3 Examples of STMVP (Spatial-Temporal Motion Vector Prediction)

Figure 6:
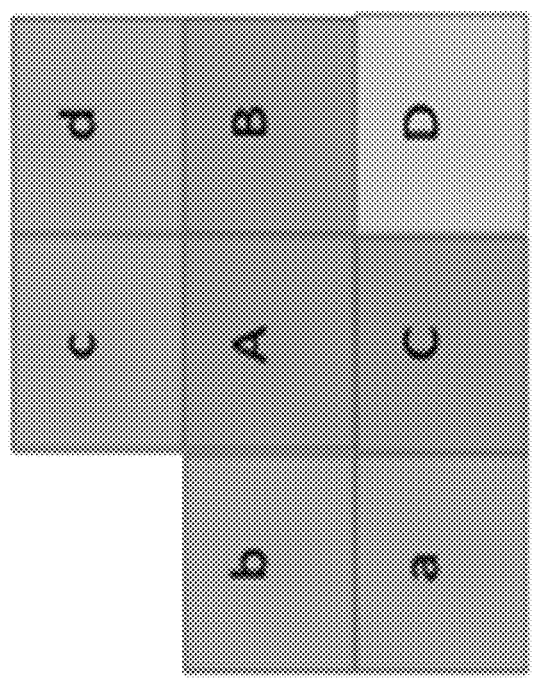
FIG. 6 shows an example of a Coding Unit (CU) with four sub-blocks (A-D) and its neighbouring blocks (a-d).
Figure 7:
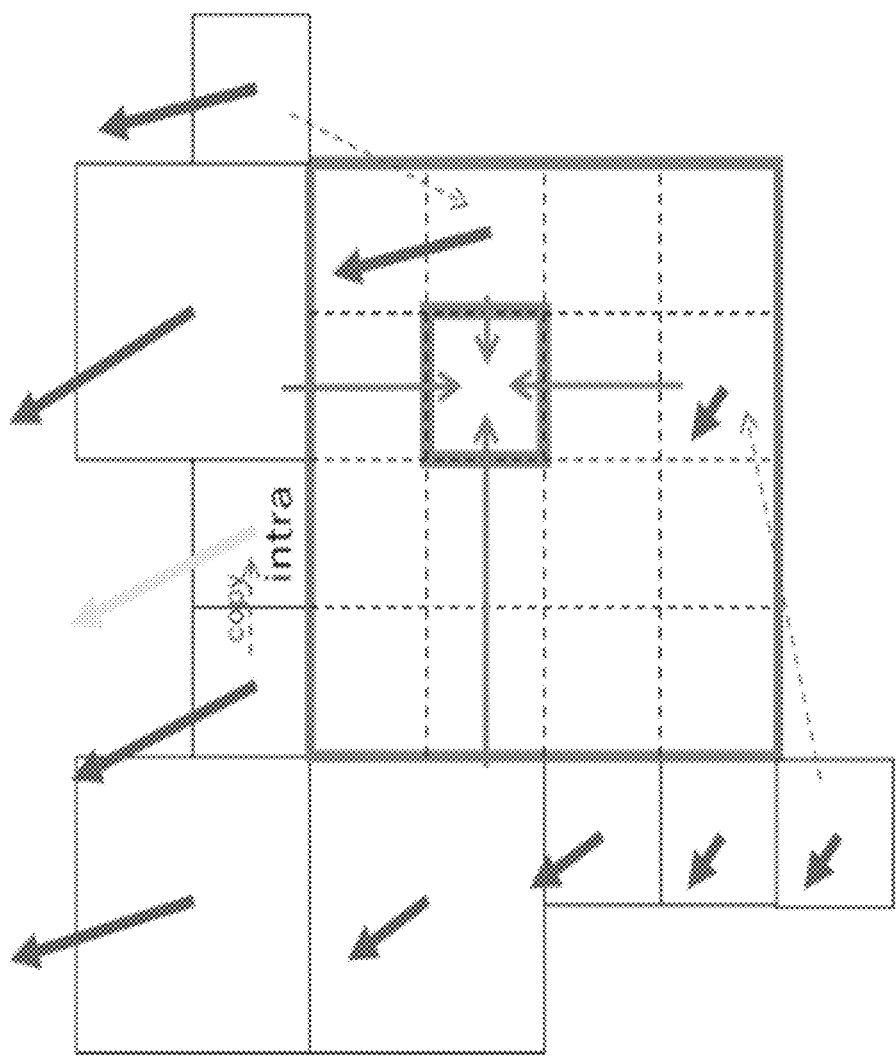
FIG. 7 shows an example of motion vector (MV) planar prediction algorithm.

STMVP was proposed and adopted in JEM, but not in VVC yet. In STMVP, the motion vectors of the sub-CUs are derived recursively, following raster scan order. FIG. 6. illustrates this concept. Let us consider an 8×8 CU which contains four 4×4 sub-CUs A, B, C, and D. The neighbouring 4×4 blocks in the current frame are labelled as a, b, c, and d.

The motion derivation for sub-CU A starts by identifying its two spatial neighbours. The first neighbour is the N×N block above sub-CU A (block c). If this block c is not available or is intra coded the other N×N blocks above sub-CU A are checked (from left to right, starting at block c). The second neighbour is a block to the left of the sub-CU A (block b). If block b is not available or is intra coded other blocks to the left of sub-CU A are checked (from top to bottom, staring at block b). The motion information obtained from the neighbouring blocks for each list is scaled to the first reference frame for a given list. Next, temporal motion vector predictor (TMVP) of sub-block A is derived by following the same procedure of TMVP derivation as specified in HEVC. The motion information of the collocated block at location D is fetched and scaled accordingly. Finally, after retrieving and scaling the motion information, all available motion vectors (up to 3) are averaged separately for each reference list. The averaged motion vector is assigned as the motion vector of the current sub-CU.

FIG. 6 shows an example of one CU with four sub-blocks (A-D) and its neighbouring blocks (a-d).

2.4 Examples of MVPlanar

MVPlanar prediction introduces subblock-level motion vector derivation. The proposed scheme generates motion vector field by interpolating motion vectors by weighted average of motion vectors of the above, above-right, left, and bottom-left neighboring blocks same as intra planar prediction. If neighboring block is not available or an intra-coded CU, substitution process is carried out in the same way as intra reference sample substation.

For MVPlanar mode, additional syntax mv_planar_flag is signaled at CU level. If mv_planar_flag is set equal to 1, inter_pred_idc and ref_idx are additionally signaled.

2.5 Examples of History-Based Motion Vector Prediction

This contribution presents a History-based Motion Vector Prediction (HMVP) method for inter coding. In HMVP, a table of HMVP candidates is maintained and updated on-the-fly. After decoding a non-affine inter-coded block, the table is updated by adding the associated motion information as a new HMVP candidate to the last entry of the table. A First-In-First-Out (FIFO) or constraint FIFO rule is applied to remove and add entries to the table. The HMVP candidates could be applied to either merge candidate list or AMVP candidate list.

The current design of affine mode has the following problems:

The current design of affine mode, a block can only apply one affine model. However, one single affine model may not describe the motion precisely enough if the motion is complex.

It is still unclear which candidates should be put in the separate merge list for sub-block-based candidates. And it is also unclear in which order these candidates should be put into the separate merge list.

3. Example Techniques

Several methods are proposed to improve coding gain of affine mode based video coding.

The detailed inventions below should be considered as examples to explain general concepts. These inventions should not be interpreted in a narrow way.

Furthermore, these inventions can be combined in any manner. Combination between this invention and other invention is also applicable.

Without specification, the following descriptions are taking one reference picture list as an example. For bi-prediction affine mode, each reference picture list could follow the methods described below.

It is proposed to store the affine model parameters instead of control point motion vectors for affine coded blocks.
  a) In one example, the parameters (a, b, c, d) for the 4-parameter affine model in Eq(1) are stored in an affine coded block; the parameters (a, b, c, d, e, f) for the 6-parameter affine model in Eq(2) are stored in an affine coded block.
  b) Alternatively, the parameters (a, b) for the 4-parameter affine model in Eq(1) are stored in an affine coded block; the parameters (a, b, c, d) for the 6-parameter affine model in Eq(2) are stored in an affine coded block.
  c) Alternatively, furthermore, one of multiple CPMVs (Such as mv0, mv1, mv2 or mv3 depicted in FIG. 3) is also stored in an affine coded block.
  d) One parameter is represented as a K-bit integer in storage. For example, K=8 or 12.

Affine motion for blocks may be derived from affine parameters instead of being purely based on CPMVs.
  a) For example, a MV for a sub-block in an affine coded block can be calculated as:

i. $\begin{cases} mv^h(x, y) = \text{Normalize}(ax - by + c) \\ mv^v(x, y) = \text{Normalize}(bx + ay + d) \end{cases}$, or  (3)

ii. $\begin{cases} mv^h(x, y) = \text{Normalize}((ax + by + e) \\ mv^v(x, y) = \text{Normalize}((cx + dy + f) \end{cases}$, or  (4)

iii. $\begin{cases} mv^h(x, y) = \text{Normalize}(ax - by) + mv_0^h \\ mv^v(x, y) = \text{Normalize}(bx + ay) + mv_0^v \end{cases}$, or  (5)

iv. $\begin{cases} mv^h(x, y) = \text{Normalize}(ax + by) + mv_0^h \\ mv^v(x, y) = \text{Normalize}(cx + dy) + mv_0^v \end{cases}$  (6)

v. In one example, vi. $\text{Normalize}(Z) = \begin{cases} (Z + \text{Off}) >> P & \text{if } Z \geq 0 \\ -((-Z + \text{Off}) >> P) & \text{Otherwise} \end{cases}$  (7)

Where P is an integer defining the precision (For example P=8) and Off is an integer rounding offset. (For example, Off=$2^{P-1}$).

The parameters of an affine block can be signaled from the encoder to the decoder.
  a) The parameters of neighbouring affine coded block can be used as prediction to code the parameters of the current affine coded block.
  b) One CPMV (Such as mv0, mv1, mv2 or mv3 in FIG. 3) can also signaled for an affine coded block. In one example, CPMV can be predicted by a MVP and a MVD is signaled as a normal MV.
  c) The parameters of an affine block can be inherited from a spatial or temporal neighbouring affine coded block.
    i. One CPMV (Such as mv0, mv1, mv2 or mv3 in FIG. 3) can be derived from a neighbouring affine coded block. For example, Eq(5)-Eq(6) can be applied to derive it, with x=x'−x0, y=y'−y0, where (x',y') is the coordinate of the position where the CPMV of the current block locates; (x0, y0) is the coordinate of the top-left corner of the neighbouring block.

In one example, there are N (N>=2) original affine models with parameters (a1, b1, c1, d1, e1, f1) . . . (aN, bN, cN, dN, eN, fN). A combined affine model (a', b', c', d', e', f') can be derived from those affine models and the current block may be predicted by the combined affine model.
  a) For example, an original affine model may be derived from an affine-coded spatial or temporal neighbouring block for the current block;
    i. In one example, affine models from some affine-coded spatial neighbouring block are not used to derive the new affine model to be used by the current block.
  b) For example, an original affine model may be derived from a constructed affine model;
    i. In one example, some constructed affine models are not used to derive the new affine model to be used by the current block.
  c) For example, (a', b', c', d', e', f')=(Fa($a_1$, . . . , $a_N$), Fb($b_1$, . . . , $b_N$), Fc($c_1$, . . . , $c_N$), Fd($d_1$, . . . , $d_N$), Fe($e_1$, . . . , $e_N$), Ff($f_1$, . . . , $f_N$)); Fa, Fb, Fc, Fd, Fe and Ff are functions.
    i. The functions are defined to be average. For example, (a', b', c', d', e', f')=(Average($a_1$, . . . , $a_N$), Average ($b_1$, . . . , $b_N$), Average ($c_1$, . . . , $c_N$), Average ($d_1$, . . . , $d_N$), Average ($e_1$, . . . , $e_N$), Average ($f_1$, . . . , $f_N$));
    ii. For example, $$(a', b', c', d', e', f') = \left( \sum_{i=1}^{N} a_i w_i^a \bigg/ \sum_{i=1}^{N} w_i^a, \sum_{i=1}^{N} b_i w_i^b \bigg/ \sum_{i=1}^{N} w_i^b, \sum_{i=1}^{N} c_i w_i^c \bigg/ \sum_{i=1}^{N} w_i^c, \sum_{i=1}^{N} d_i w_i^d \bigg/ \sum_{i=1}^{N} w_i^d, \sum_{i=1}^{N} e_i w_i^e \bigg/ \sum_{i=1}^{N} w_i^e, \sum_{i=1}^{N} f_i w_i^f \bigg/ \sum_{i=1}^{N} w_i^f \right);$$

iii. In one example, $$(a', b', c', d', e', f') = \left( \text{Normalize}\left( \sum_{i=1}^{N} a_i w_i^a, Pa \right), \right.$$

$$\text{Normalize}\left( \sum_{i=1}^{N} b_i w_i^b, Pb \right), \text{Normalize}\left( \sum_{i=1}^{N} c_i w_i^c, Pc \right), \text{Normalize}\left( \sum_{i=1}^{N} d_i w_i^d, Pd \right), \text{Normalize}\left( \sum_{i=1}^{N} e_i w_i^e, Pe \right), \text{Normalize}\left( \sum_{i=1}^{N} f_i w_i^f, Pf \right) \right), \text{ where}$$

$$\sum_{i=1}^{N} w_i^a = 2^{Pa}, \sum_{i=1}^{N} w_i^b = 2^{Pb}, \sum_{i=1}^{N} w_i^c = 2^{Pc}, \sum_{i=1}^{N} w_i^d = 2^{Pd},$$

$$\sum_{i=1}^{N} w_i^e = 2^{Pe}, \sum_{i=1}^{N} w_i^f = 2^{Pf}.$$

iv. In one example, $w_i^a = w_i^b = w_i^C = w_i^d = w_i^e = w_i^f$ for all i.
    v. In one example, N=2 and $w_i^a = w_i^b = w_i^C = w_i^d = w_i^e = w_i^f = 1$ for i=1 and 2.
    vi. In one example, some parameters may not exist. For example, $c_i$, $d_i$ do not exist, then $w_i^C$ and $w_i^d$ are set to be 0.
  d) In one example, only original affine models with 4 parameters are used to derive the combined affine model.
  e) In one example, only original affine models with 6 parameters are used to derive the combined affine model.
  f) In one example, an original affine model with 4 parameters are first converted into an affine model with 6-parameter before being used to derive the combined affine model.
    i. A 4-parameter affine model ($a_k$, $b_k$, $e_k$, $f_k$) can be converted a 6-parameter affine model as ($a_k$, $-b_k$, $b_k$, $a_k$, $e_k$, $f_k$).

It is proposed to derive new affine model based on CPMVs.
  a) In one example, there are N (N>=2) original affine models (e.g., those affine models associated with neighboring blocks) with CPMVs ($MV^0_1$, $MV^1_1$, $MV^2_1$) ... ($MV^0_N$, $MV^1_N$, $MV^2_N$). A combined affine model with CPMVs ($MV'^0$, $MV'^1$, $MV'^2$) can be derived from those affine models and the current block is predicted by the new affine model. ($MV^0$, $MV^1$, $MV^2$) represents the CPMV at the top-left corner, the top-right corner and bottom-left corner respectively. In the following discussion, MV is 2-dimension vector noted as (MVx, MVy). MV1+MV2=MV3 means MV1x+MV2x=MV3x and MV1y+MV2y=MV3y. k×MV1=MV2 means k×MV1x=MV2x and k×MV1y=MV2y.

b) For example, CPMVs of an original affine model may be derived from an affine-coded spatial or temporal neighbouring block for the current block;
  i. In one example, CPMVs of affine models derived from some affine-coded spatial neighbouring block are not used to derive the new affine model to be used by the current block.

c) For example, CPMVs of an original affine model may be derived from a constructed affine model;
  i. In one example, CPMVs of some constructed affine models are not used to derive the new affine model to be used by the current block.

d) For example, ($MV'^0$, $MV'^1$, $MV'^2$)=(F0($MV^0_1$, ..., $MV^0_N$), F1($MV^1_1$, ..., $MV^1_N$), F2($MV^2_1$, ..., $MV^2_N$)); F0, F1 and F2 are functions.
  i. In one example, Fi may be defined to be average function.
  ii. For example, ($MV'^0$, $MV'^1$, $MV'^2$)=(Average($MV^0_1$, ..., $MV^0_N$), Average($MV^1_1$, ..., $MV^1_N$), Average($MV^2_1$, ..., $MV^2_N$));
  iii. For example, $$(MV'^0, MV'^1, MV'^2) = \left(\sum_{i=1}^{N} w_i^0 MV_i^0 / \sum_{i=1}^{N} w_i^0, \sum_{i=1}^{N} w_i^1 MV_i^1 / \sum_{i=1}^{N} w_i^1, \sum_{i=1}^{N} w_i^2 MV_i^2 / \sum_{i=1}^{N} w_i^2\right);$$

iv. In one example, $$(MV'^0, MV'^1, MV'^2) = \left(\text{Normalize}\left(\sum_{i=1}^{N} w_i^0 MV_i^0, P0\right), \text{Normalize}\left(\sum_{i=1}^{N} w_i^1 MV_i^1, P1\right), \text{Normalize}\left(\sum_{i=1}^{N} w_i^2 MV_i^2, P2\right)\right),$$

where $\sum_{i=1}^{N} w_i^0 = 2^{P0}, \sum_{i=1}^{N} w_i^1 = 2^{P1}, \sum_{i=1}^{N} w_i^2 = 2^{P2}$.

v. In one example, $w_i^0 = w_i^1 = w_i^2$ for all i.
  vi. In one example, N=2 and $w_i^0 = w_i^1 = w_i^2 = 1$ for i=1 and 2.
  vii. In one example, some CPMVs may not exist. For example, $MV^2_i$ does not exist, then $w_i^2$ is set to be 0.

e) In one example, only original affine models with 4 parameters are used to derive the CPMVs of the combined affine model.

f) In one example, only original affine models with 6 parameters are used to derive the CPMVs of the combined affine model.

g) In one example, an original affine model with 4 parameters are first converted into an affine model with 6-parameter before being used to derive the CPMVs of the combined affine model.
  i. A 4-parameter affine model with two CPMVs ($MV^0_k$, $MV^1_k$) can be converted a 6-parameter affine model with three CPMVs ($MV^0_k$, $MV^1_k$, $MV^2_k$) where $MV^2_k$ can be derived by Eq(1) with x=0 and y=h where h is the height of the affine-coded block with the 4-parameter affine model.

h) In one example, $DiffMV'^1 = MV'^1 - MV'^0$ and $DiffMV'^2 = MV'^2 - MV'^0$ can be derived from the N (N>=2) original affine models. Suppose $DiffMV^1_k = MV^1_k - MV^0_k$ and $DiffMV^2_k = MV^2_k - MV^0_k$:
  i. For example, ($DiffMV'^1$, $DiffMV'^2$)=(F1($DiffMV^1_1$, ..., $DiffMV^1_N$), F2($DiffMV^2_1$, ..., $DiffMV^2_N$)); F1 and F2 are functions.
  ii. For example, ($DiffMV'^1$, $DiffMV'^2$)=(Average($DiffMV^1_1$, ..., $DiffMV^1_N$), Average($DiffMV^2_1$, ..., $DiffMV^2_N$));
  iii. For example, $$(DiffMV'^1, DiffMV'^2) = \left(\sum_{i=1}^{N} w_i^1 DiffMV_i^1 / \sum_{i=1}^{N} w_i^1, \sum_{i=1}^{N} w_i^2 DiffMV_i^2 / \sum_{i=1}^{N} w_i^2\right);$$

iv. In one example, $$(DiffMV'^1, DiffMV'^2) = \left(\text{Normalize}\left(\sum_{i=1}^{N} w_i^1 DiffMV_i^1, P1\right), \text{Normalize}\left(\sum_{i=1}^{N} w_i^2 DiffMV_i^2, P2\right)\right),$$

where $\sum_{i=1}^{N} w_i^1 = 2^{P1}, \sum_{i=1}^{N} w_i^2 = 2^{P2}$.

v. In one example, $w_i^0 = w_i^1 = w_i^2$ for all i.

i) In one example, $DiffMV'^1$ and/or $DiffMV'^2$ is derived from some original CPMVs in one way. $MV'^0$ is derived in another way; And ($MV'^0$, $MV'^0+DiffMV'^1$) or ($MV'^0$, $MV'^0+DiffMV'^1$, $MV'^0+DiffMV'^2$) is treated as the CPMVs of the combined affine model.
  i. For example, $DiffMV'^1$ and/or $DiffMV'^2$ is derived by combining two affine coded spatial neighbouring blocks. $MV'^0$ is copied or scaled from block A2 or block B2 or block B3 in FIG. 5.

j) In one example, only original CPMVs referring to the same reference picture can be combined.
  i. Alternatively, CPMVs referring to different reference pictures should be scaled to the same reference picture before being combined.

N (N>=2) temporary predictions for the current block may be firstly generated by N affine models, and the final prediction can be a combination of the temporary predictions. Suppose the N original predictions for the current block are denoted as P1(x,y), ..., PN(x,y). The final prediction is denoted as P'(x,y).

a) For example, P'(x,y)=$F^{x,y}$(P1(x,y), ..., PN(x,y)), $F^{x,y}$ is a bundle of functions depending on the sample position (x,y);

b) For example, P'(x,y)=Average($P_1(x,y)$, ..., $P_N(x,y)$);

c) For example, $$P'(x, y) = \sum_{i=1}^{N} w_i^{(x,y)} P_i(x, y) / \sum_{i=1}^{N} w_i^{(x,y)};$$

d) In one example, $$P'(x, y) = \text{Normalize}\left(\sum_{i=1}^{N} w_i^{(x,y)} P_i(x, y) / \sum_{i=1}^{N} w_i^{(x,y)}, S(x, y)\right),$$

where $\sum_{i=1}^{N} w_i^{(x,y)} = 2^{S(x,y)}$ e) In one example, $w_i^{(x,y)}$ is the same for all (x,y).
f) In one example, $w_i^{(x,y)}$ is the same for all i.
g) In one example, N=2 and $w_1^{(x,y)} = w_2^{(x,y)} = 1$ for all (x,y).
h) In one example, $P_1(x,y), \ldots, P_N(x,y)$ should be generated by affine models referring to the same reference picture.
i) Alternatively, $P_1(x,y), \ldots, P_N(x,y)$ should be generated by affine models referring to reference pictures in the same reference list.
j) In one example, $P_1(x,y)$ and $P_2(x,y)$ cannot be combined to as a combined candidate if they are the two predictions referring to reference list 0 and reference list 1 of a bi-prediction candidate already in the candidate list.

It is proposed to jointly use affine motion and non-affine motion for one block.
   a) In one example, there are N1 (N1>=1) temporary predictions for the current block generated by N1 affine models and N2 (N2>=1) temporary predictions for the current block generated by N2 non-affine prediction, the final prediction can be a combination of the affine predictions and non-affine predictions. Suppose the N1 original affine predictions for the current block are denoted as $P_1(x,y), \ldots, P_{N1}(x,y)$. the N1 original non-affine predictions for the current block are denoted as $Q_1(x,y), \ldots, Q_{N2}(x,y)$. The final prediction is denoted as P'(x,y).
   b) Non-affine prediction includes non-affine inter-prediction, intra-prediction, intra-block-copy, inter-layer prediction in scalable video coding, inter-view prediction in multiview video coding or 3D video coding.
      i. Specifically, non-affine inter-prediction includes other sub-block based prediction such as ATMVP, STMVP and MVPlanar prediction.
      ii. Alternatively, N1=0, and the other sub-block-based prediction such as ATMVP, STMVP and MVPlanar prediction can be combined with each other.
   c) For example, $P'(x,y) = F^{x,y}(P_1(x,y), \ldots, P_{N1}(x,y), Q_1(x,y), \ldots, Q_{N2}(x,y))$, $F^{x,y}$ is a bundle of functions depending on the sample position (x,y);
      i. For example, $P'(x,y) = \text{Average}(P_1(x,y), \ldots, P_{N1}(x, y)), Q_1(x,y), \ldots, Q_{N2}(x,y))$;
      ii. For example, $$P'(x, y) = \left(\sum_{i=1}^{N1} w_i^{(x,y)} P_i(x, y) + \sum_{i=1}^{N2} v_i^{(x,y)} Q_i(x, y)\right) / \left(\sum_{i=1}^{N1} w_i^{(x,y)} + \sum_{i=1}^{N2} v_i^{(x,y)}\right);$$

iii. In one example, $$P'(x, y) = \text{Normalize}\left(\left(\sum_{i=1}^{N1} w_i^{(x,y)} P_i(x, y) + \right.\right.$$

$$\left.\left.\sum_{i=1}^{N2} v_i^{(x,y)} Q_i(x, y)\right) / \left(\sum_{i=1}^{N1} w_i^{(x,y)} + \sum_{i=1}^{N2} v_i^{(x,y)}\right), S(x, y)\right),$$

where $\sum_{i=1}^{N1} w_i^{(x,y)} + \sum_{i=1}^{N2} v_i^{(x,y)} = 2^{S(x,y)}$.

iv. In one example, $w_i^{(x,y)}$ is the same for all (x,y).
      v. In one example, $w_i^{(x,y)}$ is the same for all i.
      vi. In one example, $v_i^{(x,y)}$ is the same for all (x,y).
      vii. In one example, $v_i^{(x,y)}$ is the same for all i.
      viii. In one example, $v_i^{(x,y)} = w_i^{(x,y)}$ for all (x,y).
      ix. In one example, $v_i^{(x,y)} = w_i^{(x,y)}$ for all i.
      x. In one example, N1=1, N2=1 and $w_1^{(x,y)} = v_1^{(x,y)} = 1$ for all (x,y).
   d) In one example, for one prediction direction (one reference picture list), affine motion may be utilized to derive temporary prediction blocks and the other prediction direction, non-affine motion may be utilized to derive temporary prediction blocks.
      i. Alternatively, furthermore, the affine flag may be signaled for each reference picture list.
   e) In one example, for one prediction direction (one reference picture list), both affine motion and non-affine motion may be utilized to derive temporary prediction blocks.

More than one combined affine models can be derived and serve as affine MVP candidates or merge candidates
   a) In one example, affine parameters or CPMVs of each two affine coded spatial neighbouring blocks are combined to generate a combined candidate with the affine parameters or CPMVs of a new affine model, and this combined affine model is added into the affine MVP candidate list or affine merge list.
      i. In another example, temporary predictions generated from the affine models of each two affine coded spatial neighbouring blocks are combined to generate the combined candidate with the combined prediction.
      ii. The combined candidate may be put into the candidate list after normal affine AMVP or merge candidates inherited from spatial neighbouring blocks.
      iii. The number of combined candidate put into the candidate list cannot exceed a fixed number such as 5.

After coding/decoding an affine coded block, the two or three CPMVs can be put into the lookup table in HMVP.
   a) In one example, a separate lookup table (named CPMV lookup table) is used to store CPMVs. An entry in the CPMV lookup table stores two or three CPMVs coming from an affine coded block.
   b) Number of HMVP candidates for coding affine coded blocks may be fixed, or adaptively changed (such as based on coded information, including block size, block shape, slice type; or based on number of available candidates before adding HMVP candidates)

There are several possible orders to put sub-block-based merge candidates into the sub-block-based merge candidate list (which may be different to the normal merge candidate list). Denotes:
   ATMVP candidate: AT; STMVP candidate: ST;
   Affine merge candidate inherited from an affine coded neighbouring block: Aff;
   Constructed affine merge candidate: vAff;

Combined merge candidate: cAff (combined between any sub-block merge candidate including affine or non-affine);

Zero candidate: Z

It is proposed to use the following orders for the sub-block-based merge candidate list:

a) AT→ST→Aff→vAff→Z;
b) AT→Aff→ST→vAff→Z;
c) Aff→AT→ST→vAff→Z;
d) Aff→ST→AT→vAff→Z;
e) ST→AT→Aff→vAff→Z;
f) ST→Aff→AT→vAff→Z;
g) AT→ST→Aff→cAff→vAff→Z;
h) AT→Aff→ST→cAff→vAff→Z;
i) Aff→AT→ST→cAff→vAff→Z;
j) Aff→ST→AT→cAff→vAff→Z;
k) ST→AT→Aff→cAff→vAff→Z;
l) ST→Aff→AT→cAff→vAff→Z;
m) AT→ST→Aff→vAff→cAff→Z;
n) AT→Aff→ST→vAff→cAff→Z;
o) Aff→AT→ST→vAff→cAff→Z;
p) Aff→ST→AT→vAff→cAff→Z;
q) ST→AT→Aff→vAff→cAff→Z;
r) ST→Aff→AT→vAff→cAff→Z;
s) AT→ST→Aff→cAff→Z;
t) AT→Aff→ST→cAff→Z;
u) Aff→AT→ST→cAff→Z;
v) Aff→ST→AT→cAff→Z;
w) ST→AT→Aff→cAff→Z;
x) ST→Aff→AT→cAff→Z;
y) The order may be adaptively changed from block to block.

The number of a kind of sub-block-based candidate added into the list cannot exceed a number.

a) For example, the number of affine merge candidate inherited from an affine coded neighbouring block cannot exceed N, such as 2, 3, 4, 5,6;
b) For example, the number of constructed affine merge candidate cannot exceed N, such as 0, 1, 2, 3, 4, 5,6;
c) For example, the number of combined merge candidate cannot exceed N, such as 0, 1, 2, 3, 4, 5,6;
d) Number of one kind of sub-block-based candidates for coding affine coded blocks may be fixed, or adaptively changed (such as based on coded information, including block size, block shape, slice type; or based on number of available candidates before adding such kind of candidates)

Figure 8:
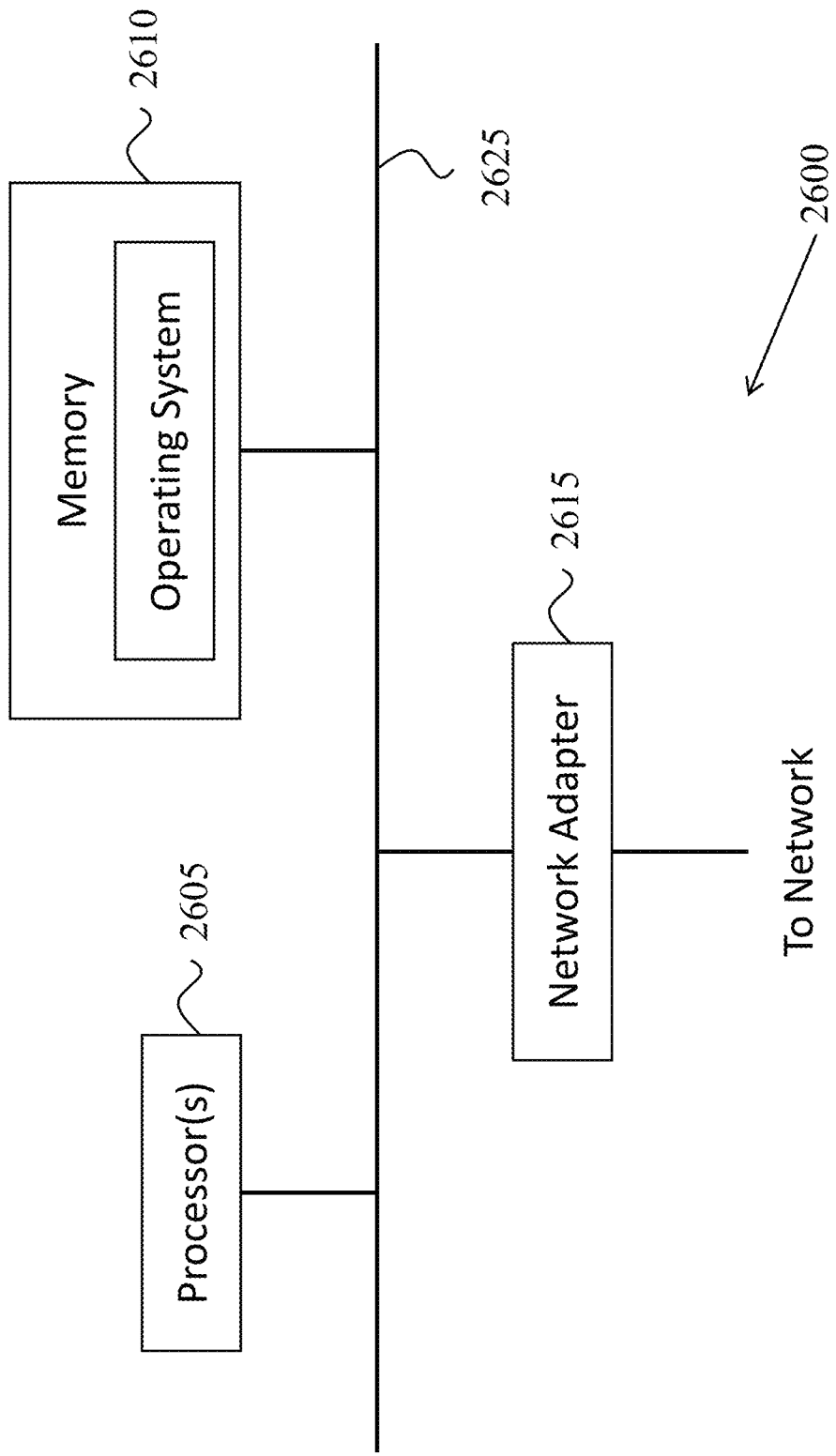
FIG. 8 is a block diagram illustrating an example of the architecture for a computer system or other control device that can be utilized to implement various portions of the presently disclosed technology.

FIG. 8 is a block diagram illustrating an example of the architecture for a computer system or other control device 2600 that can be utilized to implement various portions of the presently disclosed technology. In FIG. 8, the computer system 2600 includes one or more processors 2605 and memory 2610 connected via an interconnect 2625. The interconnect 2625 may represent any one or more separate physical buses, point to point connections, or both, connected by appropriate bridges, adapters, or controllers. The interconnect 2625, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 2605 may include central processing units (CPUs) to control the overall operation of, for example, the host computer. In certain embodiments, the processor(s) 2605 accomplish this by executing software or firmware stored in memory 2610. The processor(s) 2605 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 2610 can be or include the main memory of the computer system. The memory 2610 represents any suitable form of random access memory (RAM), read-only memory (ROM), flash memory, or the like, or a combination of such devices. In use, the memory 2610 may contain, among other things, a set of machine instructions which, when executed by processor 2605, causes the processor 2605 to perform operations to implement embodiments of the presently disclosed technology.

Also connected to the processor(s) 2605 through the interconnect 2625 is a (optional) network adapter 2615. The network adapter 2615 provides the computer system 2600 with the ability to communicate with remote devices, such as the storage clients, and/or other storage servers, and may be, for example, an Ethernet adapter or Fiber Channel adapter.

Figure 9:
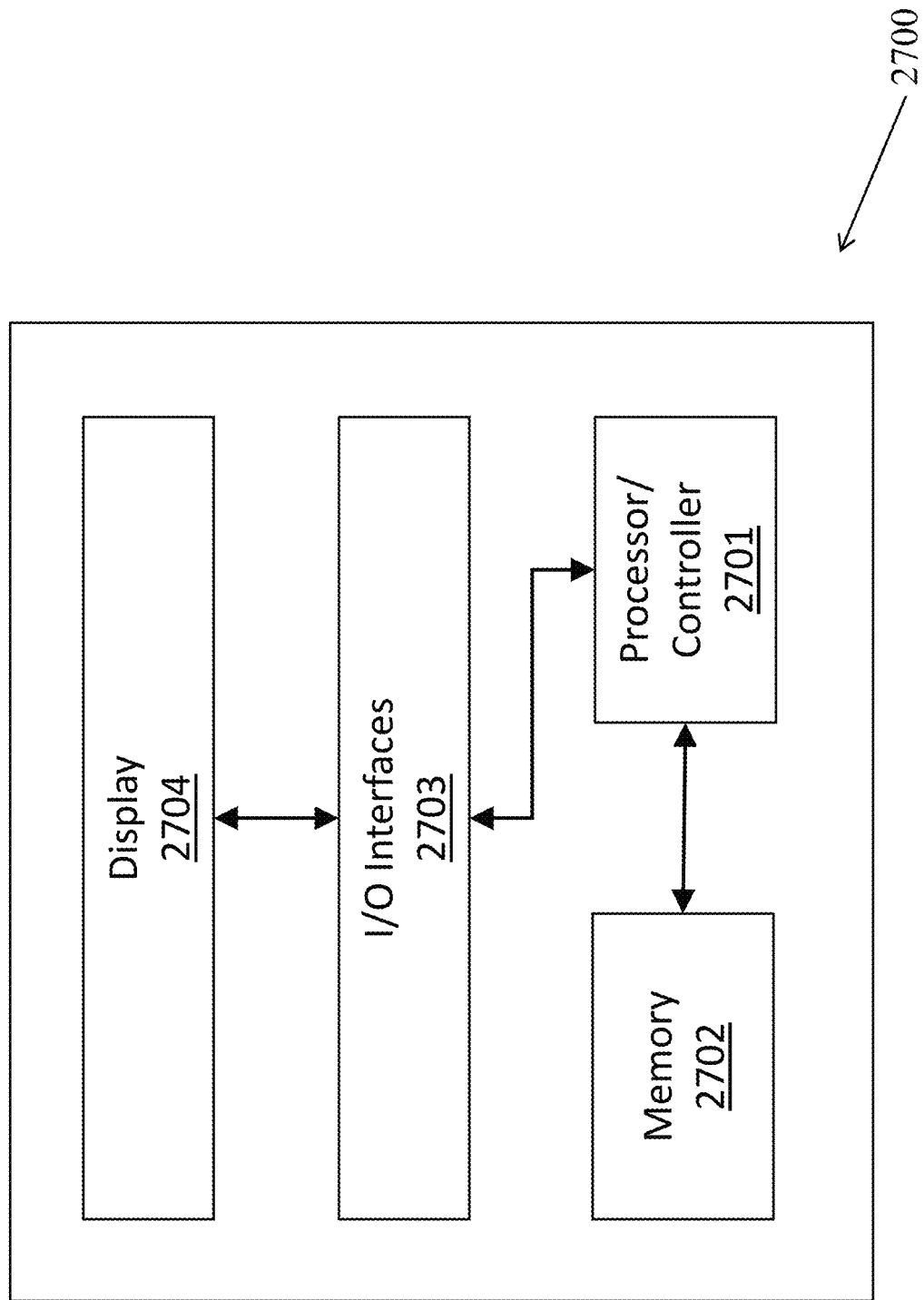
FIG. 9 shows a block diagram of an example embodiment of a mobile device that can be utilized to implement various portions of the presently disclosed technology.

FIG. 9 shows a block diagram of an example embodiment of a mobile device 2700 that can be utilized to implement various portions of the presently disclosed technology. The mobile device 2700 can be a laptop, a smartphone, a tablet, a camcorder, or other types of devices that are capable of processing videos. The mobile device 2700 includes a processor or controller 2701 to process data, and memory 2702 in communication with the processor 2701 to store and/or buffer data. For example, the processor 2701 can include a central processing unit (CPU) or a microcontroller unit (MCU). In some implementations, the processor 2701 can include a field-programmable gate-array (FPGA). In some implementations, the mobile device 2700 includes or is in communication with a graphics processing unit (GPU), video processing unit (VPU) and/or wireless communications unit for various visual and/or communications data processing functions of the smartphone device. For example, the memory 2702 can include and store processor-executable code, which when executed by the processor 2701, configures the mobile device 2700 to perform various operations, e.g., such as receiving information, commands, and/or data, processing information and data, and transmitting or providing processed information/data to another device, such as an actuator or external display. To support various functions of the mobile device 2700, the memory 2702 can store information and data, such as instructions, software, values, images, and other data processed or referenced by the processor 2701. For example, various types of Random Access Memory (RAM) devices, Read Only Memory (ROM) devices, Flash Memory devices, and other suitable storage media can be used to implement storage functions of the memory 2702. In some implementations, the mobile device 2700 includes an input/output (I/O) unit 2703 to interface the processor 2701 and/or memory 2702 to other modules, units or devices. For example, the I/O unit 2703 can interface the processor 2701 and memory 2702 with to utilize various types of wireless interfaces compatible with typical data communication standards, e.g., such as between the one or more computers in the cloud and the user device. In some implementations, the mobile device 2700 can interface with other devices using a wired connection via the I/O unit 2703. The mobile device 2700 can also interface with other external interfaces, such as data storage, and/or visual or audio display devices 2704, to retrieve and transfer data and information that can be processed by the processor, stored in the memory, or exhibited on an output unit of a display device 2704 or an external device. For example, the display device 2704 can display a video frame modified based on the MVPs in accordance with the disclosed technology.

Figure 10:
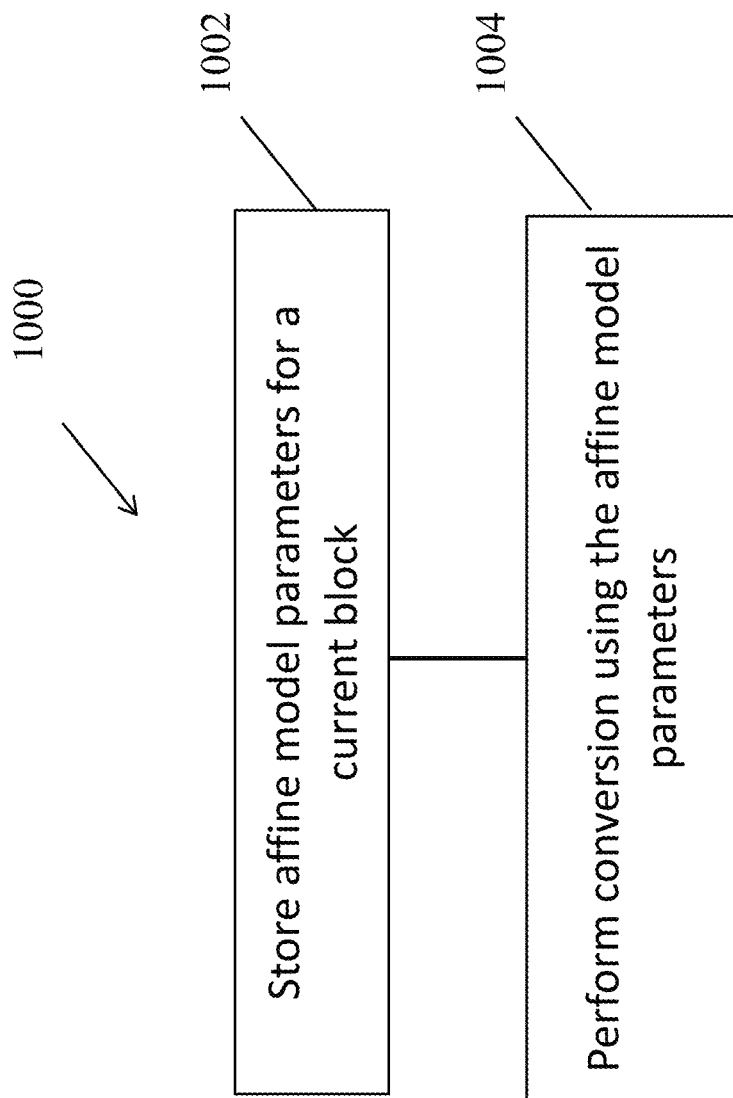
FIG. 10 is a flowchart for an example method of video processing.

FIG. 10 is a flowchart representation of a method 1000 of video coding. The method 1000 includes storing (1002), during a conversion between a current block of video and a bitstream representation of the current block, affine model parameters for the current block, and performing (1004) the conversion using the affine model parameters.

Another method of video processing includes deriving, during a conversion between a current block of video and a bitstream representation of the current block, a new affine model for the current block using control point motion vectors (CPMVs) of original affine models, and performing the conversion using the new affine model.

Another method of video processing includes using, during a conversion between a current block of video and a bitstream representation of the current block, a combination prediction from N1 affine predictions and N2 non-affine predictions, wherein N1 and N2 are integers, and performing the conversion using the combination prediction.

Another method of video processing includes using, during a conversion between a current block of video and a bitstream representation of the current block, a sub-block based merge list for the current block, and performing the conversion using the sub-block based merge list.

In yet another representative aspect, the various techniques described herein may be embodied as a computer program product stored on a non-transitory computer readable media. The computer program product includes program code for carrying out the methods described herein.

In yet another representative aspect, a video decoder apparatus may implement a method as described herein.

In yet another aspect, a video encoder apparatus comprising a processor is disclosed. The video encoder apparatus implements a method described herein.

These methods may be described using the following clauses

1. A method of video processing, comprising: storing, during a conversion between a current block of video and a bitstream representation of the current block, affine model parameters for the current block; and performing the conversion using the affine model parameters.

2. The method of clause 1, wherein the conversion comprises reconstructing the current block from the bitstream representation.

3. The method of clause 1, wherein the conversion comprises generating the bitstream representation from the current block.

4. The method of any of clauses 1 to 3, wherein the conversion is performing without storing control point motion vectors of the current block.

5. The method of any of clauses 1 to 4, wherein the affine model parameters comprises four parameters of a 4-parameter affine model.

6. The method of any of clauses 1 to 4, wherein the storing the affine model parameters includes storing two parameters for a 4-parameter affine model and four parameters for a 6-parameter affine model.

7. The method of any of clauses 1 to 3, wherein the performing the conversion includes deriving affine motion for the current block from the affine model parameters, without using control point motion vectors.

8. The method of any of clauses 1 to 3, wherein the bitstream representation includes values of the affine model parameters.

9. The method of clause 8, wherein the bitstream representation further includes a control point motion vector value for the current block.

10. The method of any of clauses 1 to 3, wherein the performing the conversion includes predicting a prediction of the current block by a combined affine model that is derived from multiple affine models for the current block.

Further examples of clauses 1 to 10 are provided in Technique 1 in section 4.

11. A method of video processing, includes deriving, during a conversion between a current block of video and a bitstream representation of the current block, a new affine model for the current block using control point motion vectors (CPMVs) of original affine models; and performing the conversion using the new affine model.

12. The method of clause 11, wherein the conversion comprises reconstructing the current block from the bitstream representation.

13. The method of clause 11, wherein the conversion comprises generating the bitstream representation from the current block.

14. The method of any of clauses 11 to 13, wherein N original affine models are combined, where N is an integer greater than 1.

15. The method of any of clauses 11 to 14, wherein the performing the conversion includes determining a predicted current block from the new affine model.

16. The method of any of clauses 11 to 15, wherein CPMVs of an original affine model are derived from another an affine coded spatial or temporal neighboring block.

17. The method of clause 15, wherein the determining the predicted current block includes: generating temporary predictions of the current block from the original affine models, and determining the predicted current block from a final prediction that is a combination of the temporary predictions.

Additional examples of the method described in clauses 11 to 17 are provided in Technique 2 in section 4.

18. A method of video coding, comprising: using, during a conversion between a current block of video and a bitstream representation of the current block, a combination prediction from N1 affine predictions and N2 non-affine predictions, wherein N1 and N2 are integers; and performing the conversion using the combination prediction.

19. The method of clause 18, wherein the conversion comprises reconstructing the current block from the bitstream representation.

20. The method of clause 18, wherein the conversion comprises generating the bitstream representation from the current block.

21. The method of any of clauses 18 to 21, wherein the performing the conversion includes: generating N1 temporary predictions from the N1 affine predictions; and combining the N1 temporary predictions with N2 predictions generated from the N2 non-affine predictions.

22. The method of any of clauses 18 to 21, wherein the N2 non-affine predictions include one or more of inter-prediction, intra-prediction, intra-block-copy, inter-layer prediction in scalable video coding, inter-view prediction in multiview video coding or 3D video coding.

23. The method of any of clauses 18 to 21, further including generating an additional combination prediction and using the combination prediction and the additional combination prediction as affine candidates or merge candidates during the conversion.

Additional examples of embodiments of techniques 18 to 23 are described with respect to Technique 3 to 6 in Section 4.

24. A method of video coding, comprising: using, during a conversion between a current block of video and a bitstream representation of the current block, a sub-block based merge list for the current block; and performing the conversion using the sub-block based merge list.

25. The method of clause 24, wherein the conversion comprises reconstructing the current block from the bitstream representation.

26. The method of clause 23, wherein the conversion comprises generating the bitstream representation from the current block.

27. The method of any of clauses 24 to 26, wherein an order of generating the sub-block based merge list includes at least one of:

AT→ST→Aff→vAff→Z;
AT→Aff→ST→vAff→Z;
Aff→AT→ST→vAff→Z;
Aff→ST→AT→vAff→Z;
ST→AT→Aff→vAff→Z;
ST→Aff→AT→vAff→Z;
AT→ST→Aff→cAff→vAff→Z;
AT→Aff→ST→cAff→vAff→Z;
Aff→AT→ST→cAff→vAff→Z;
Aff→ST→AT→cAff→vAff→Z;
ST→AT→Aff→cAff→vAff→Z;
ST→Aff→AT→cAff→vAff→Z;
AT→ST→Aff→vAff→cAff→Z;
AT→Aff→ST→vAff→cAff→Z;
Aff→AT→ST→vAff→cAff→Z;
Aff→ST→AT→vAff→cAff→Z;
ST→AT→Aff→vAff→cAff→Z;
ST→Aff→AT→vAff→cAff→Z;
AT→ST→Aff→cAff→Z;
AT→Aff→ST→cAff→Z;
Aff→AT→ST→cAff→Z;
Aff→ST→AT→cAff→Z;
ST→AT→Aff→cAff→Z;
ST→Aff→AT→cAff→Z;
adaptively changed from block to block;
wherein AT represents advanced temporal motion vector prediction candidate, ST represents spatio temporal motion vector prediction candidate, Aff represents affine merge candidate inherited from an affine coded neighbouring block, vAff represents constructed affine merge candidate, cAff represents combined merge candidate, and Z represents Zero candidate: Z 28. The method of any of clauses 24 to 27, wherein a length of the sub-block based merge list is less than N, wherein N is an integer between 0 and 6.

Some embodiments of these techniques are described in Technique 7 in Section 4.

In the above-described clauses, the conversion operating may be, for example, video compression or decompression operation.

Figure 11:
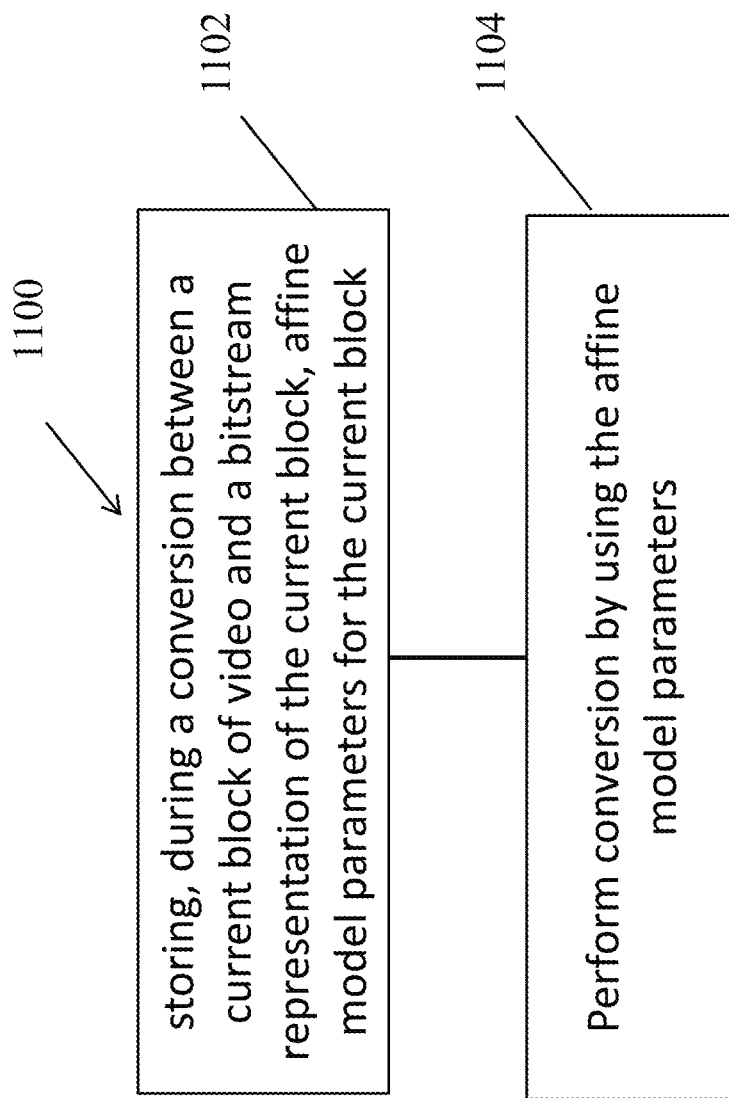
FIG. 11 is a flowchart for another example method of video processing.

FIG. 11 is a flowchart representation of a method 1100 of video coding. The method 1100 includes storing (1102), during a conversion between a current block of video and a bitstream representation of the current block, affine model parameters for the current block, and performing (1104) the conversion using the affine model parameters, wherein the affine model parameters are derived at least from motion vectors of control points of the current block.

In some embodiments, performing the conversion without storing control point motion vectors of the current block.

In some embodiments, a number of the stored affine model parameters is based on the affine model.

In some embodiments, the storing the affine model parameters includes storing two or four parameters for a 4-parameter affine model.

In some embodiments, the storing the affine model parameters includes storing four or six parameters for a 6-parameter affine model.

In some embodiments, the method further comprising storing one of multiple control point motion vectors of the current block.

In some embodiments, one parameter is represented as a K-bit integer in storage, K is 8 or 12.

In some embodiments, the performing the conversion includes deriving affine motion for sub-blocks of the current block from the affine model parameters.

In some embodiments, the performing the conversion includes deriving affine motion for sub-blocks of the current block from the affine model parameters and one of multiple control point motion vectors.

In some embodiments, the number of the affine model parameters used to derive affine motion for the sub-block of the current block is based on the affine model.

In some embodiments, the affine motion for the sub-block of the current block is derived as a normalization function based on the affine model parameters.

In some embodiments, the affine motion for the sub-block of the current block is derived as a normalization function based on the affine model parameters adding one of multiple control point motion vectors.

Figure 12:
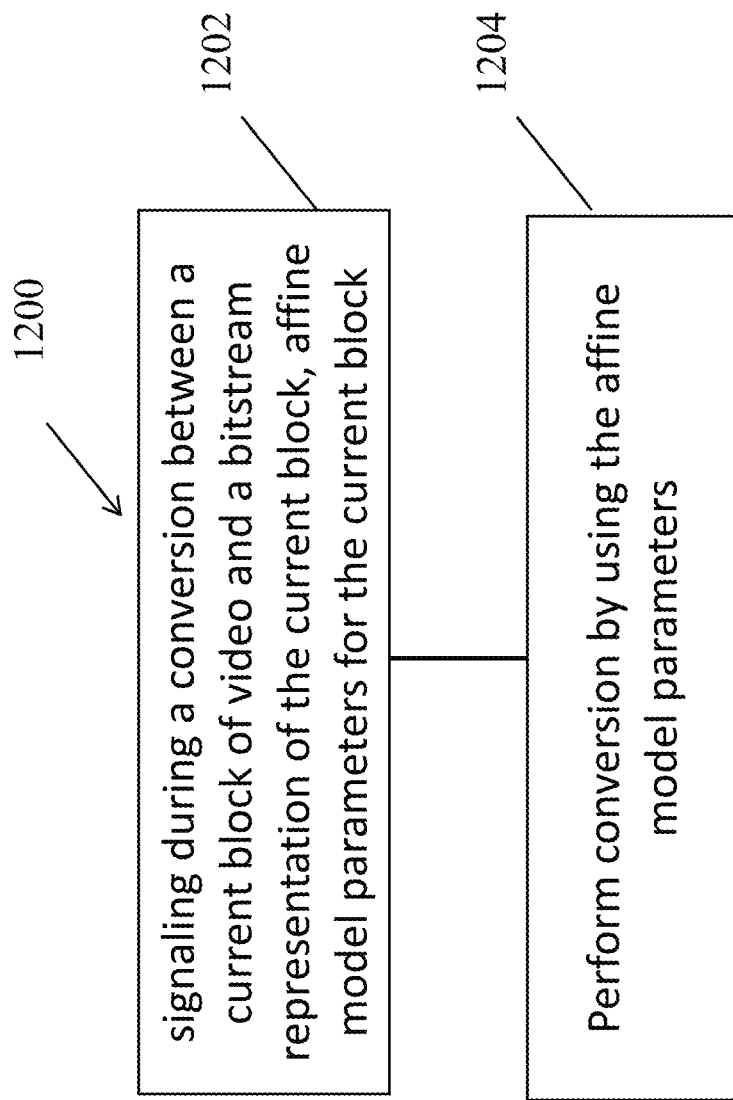
FIG. 12 is a flowchart for another example method of video processing.

FIG. 12 is a flowchart representation of a method 1200 of video coding. The method 1200 includes signaling (1202), during a conversion between a current block of video and a bitstream representation of the current block, affine model parameters for the current block; and performing (1204) the conversion using the affine model parameters, wherein the affine model parameters are derived at least from motion vectors of control points of the current block.

In some embodiments, the affine model parameters for the current block is predicted from parameters of neighboring affine block.

In some embodiments, one of multiple control point motion vectors is signaled for the current block.

In some embodiments, the one control point motion vector is predicted by a motion vector prediction, and a Motion Vector Difference (MVD) is signaled as a normal motion vector.

In some embodiments, the parameters for the current block is derived from a spatial or temporal neighboring block of the current block.

In some embodiments, one of multiple control point motion vectors is derived from the spatial or temporal neighboring block of the current block.

Figure 13:
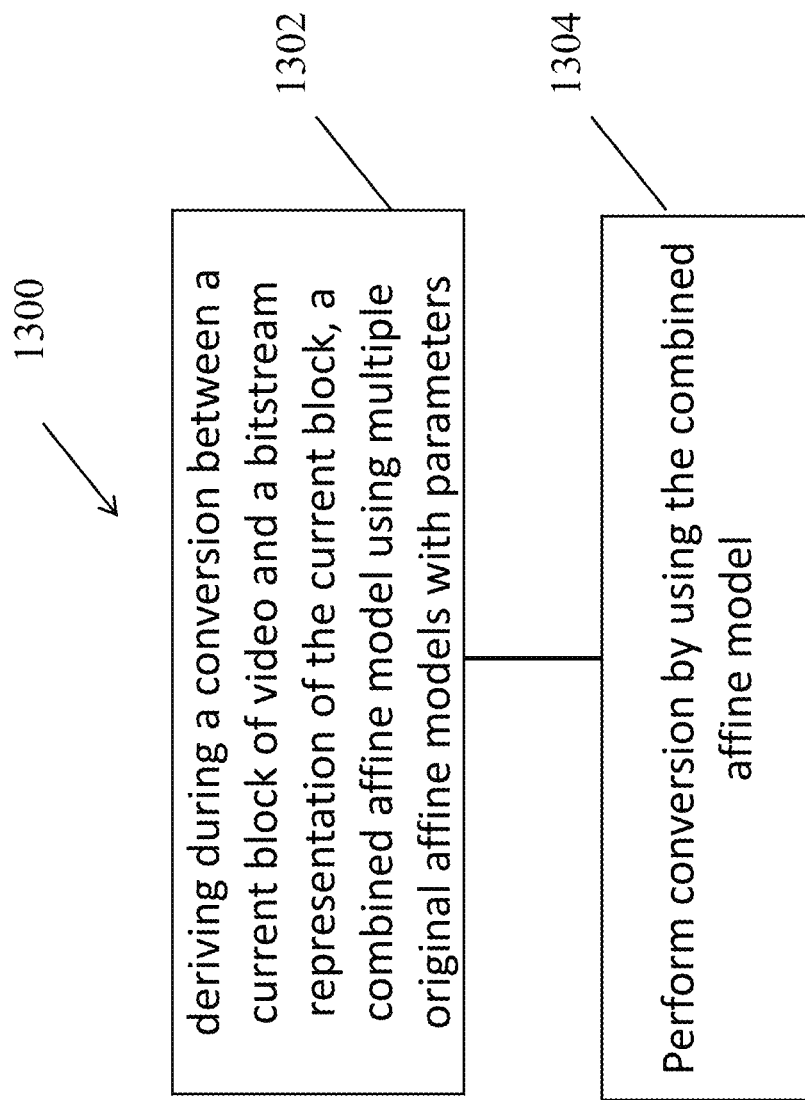
FIG. 13 is a flowchart for another example method of video processing.

FIG. 13 is a flowchart representation of a method 1300 of video coding. The method 1300 includes deriving (1302), during a conversion between a current block of video and a bitstream representation of the current block, a combined affine model using multiple original affine models with parameters; and performing (1304) the conversion by using the combined affine model, wherein the affine model parameters are derived at least from motion vectors of control points of the current block.

In some embodiments, the original affine model is derived from an affine-coded spatial or temporal neighboring block for the current block.

In some embodiments, the original affine model is derived from one or multiple constructed affine models.

In some embodiments, the combined affine model has a first set of parameters, and the multiple original affine models have multiple second sets of parameters respectively, each parameter in the first set of parameters is a function of corresponding parameters in each of the multiple second set of parameters.

In some embodiments, the function is an average function, a weighted average function, or normalized function.

In some embodiments, weighed values for the motion vectors used in the weighted average function are the same.

In some embodiments, some parameters in the second set of parameters do not exist, and the corresponding weighed values are set to be 0.

In some embodiments, only original affine models with 4 parameters are used to derive the combined affine model.

In some embodiments, only original affine models with 6 parameters are used to derive the combined affine model.

In some embodiments, the method further comprising: converting an original affine model with 4 parameters into an affine model with 6 parameters; and deriving the combined affine model using the converted affine model with 6 parameters.

In some embodiments, converting an original affine model with 4 parameters into an affine model with 6 parameters includes adding a first parameter which is a negative of one parameter of the 4 parameters, and adding a second parameter which is same as another parameter of the 4 parameters.

In some embodiments, the conversion comprises reconstructing the current block from the bitstream representation.

In some embodiments, the conversion comprises generating the bitstream representation from the current block.

Figure 14:
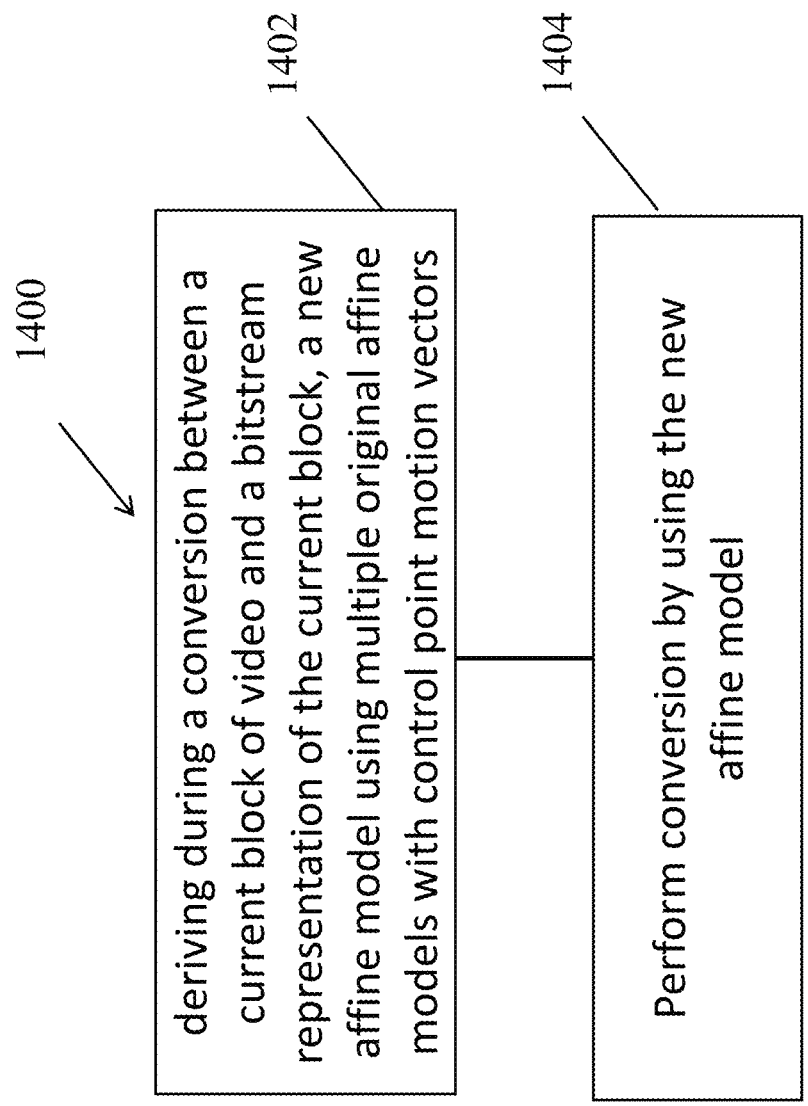
FIG. 14 is a flowchart for another example method of video processing.

FIG. 14 is a flowchart representation of a method 1400 of video coding. The method 1400 includes deriving (1402), during a conversion between a current block of video and a bitstream representation of the current block, a new affine model using multiple original affine models with control point motion vectors; and performing (1304) the conversion by using the new affine model.

In some embodiments, at least one of the multiple original affine models is an affine model associated with neighboring blocks of the current block.

In some embodiments, the control point motion vectors of the original affine model are derived from an affine-coded spatial or temporal neighboring block for the current block.

In some embodiments, the control point motion vectors of the affine models derived from some affine-coded spatial neighboring block are not used to derive the new affine model to be used by the current block.

In some embodiments, the control point motion vectors of the original affine model is derived from one or multiple constructed affine models.

In some embodiments, the control point motion vectors of some constructed affine models are not used to derive the new affine model to be used by the current block.

In some embodiments, the new affine model has a first set of control point motion vectors, and the multiple original affine models have multiple second sets of control point motion vectors respectively, each control point motion vector in the first set of control point motion vectors is a function of corresponding control point motion vectors in each of the multiple second set of control point motion vectors.

In some embodiments, the function is an average function, a weighted average function, or normalized function.

In some embodiments, weighed values for the control point motion vectors used in the weighted average function are the same.

In some embodiments, some motion vectors in the second set of control point motion vectors do not exist, and the corresponding weighed values are set to be 0.

In some embodiments, only original affine models with 4 parameters are used to derive the new affine model.

In some embodiments, only original affine models with 6 parameters are used to derive the new affine model.

In some embodiments, the method further comprising: converting an original affine model with 4 parameters into an affine model with 6 parameters; and deriving control point motion vectors of the new affine model using the converted affine model with 6 parameters.

In some embodiments, converting an original affine model with 4 parameters into an affine model with 6 parameters includes: converting a 4-parameters affine model with two control point motion vectors into a 6-parameters affine model with three control point motion vectors by adding a new control point motion vector.

In some embodiments, motion vector differences between control point motion vectors of the new affine model are derived from the multiple original affine models, each of motion vector differences between control point motion vectors of the new affine model is a function of corresponding motion vector differences for between control point motion vectors of each of original affine models.

In some embodiments, the function is an average function, a weighted average function, or normalized function.

In some embodiments, weighed values for the control point motion vector differences used in the weighted average function are the same.

In some embodiments, motion vector differences between control point motion vectors of the new affine model are derived in a first way, and a first control point motion vector of the new affine mode is derived in a second way, the control point motion vectors of the new affine mode are derived based on the first control point motion vector and corresponding motion vector difference.

In some embodiments, motion vector differences between control point motion vectors of the new affine model are derived by combining two affine coded spatial neighboring blocks, and the first control point motion vector of the new affine mode is copied or scaled from certain blocks.

In some embodiments, only the control point motion vectors of the original affine models referring to the same reference picture are combined.

In some embodiments, the control point motion vectors of the original affine models referring to different reference pictures is scaled to the same reference picture before being combined.

Figure 15:
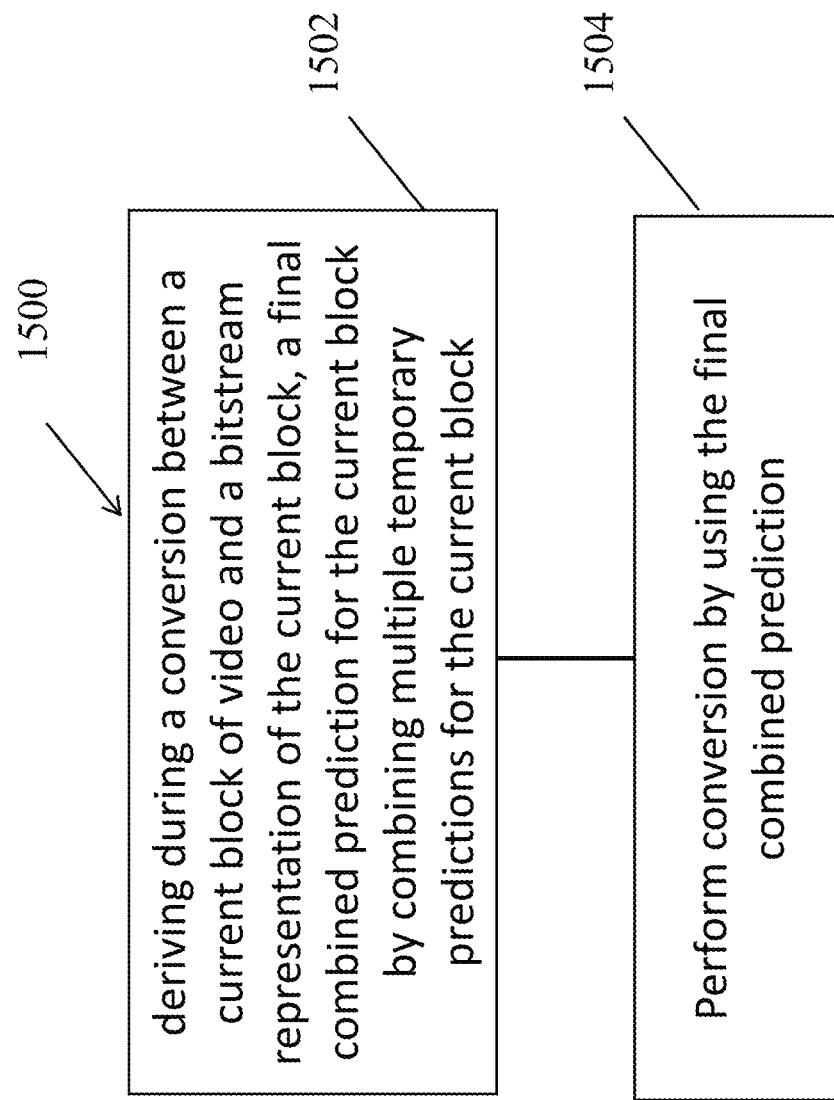
FIG. 15 is a flowchart for another example method of video processing.

FIG. 15 is a flowchart representation of a method 1500 of video coding. The method 1500 includes deriving (1502), during a conversion between a current block of video and a bitstream representation of the current block, a final combined prediction for the current block by combining multiple temporary predictions for the current block; and performing (1504) the conversion by using the final combined prediction.

In some embodiments, the multiple temporary predictions for the current block is firstly generated by using multiple affine models.

In some embodiments, a first subset of the multiple temporary predictions for the current block are generated by using a first multiple affine models, and a second subset, different from the first subset, of the multiple temporary predictions for the current block are generated by using a second multiple non-affine predictions.

In some embodiments, the final combined prediction is a function of the multiple temporary predictions.

In some embodiments, the function is a bundle of functions depending on the same position, an average function, a weighted average function, or normalized function.

In some embodiments, weighed values for the multiple temporary predictions used in the weighted average function are the same for all positions, or weighed values for the multiple temporary predictions used in the weighted average function are the same for all of the multiple temporary predictions.

In some embodiments, weighed values for the first subset of the multiple temporary predictions used in the weighted average function are the same for all positions for at least one temporary prediction in the first subset, or weighed values at least on one position for the first subset of the multiple temporary predictions used in the weighted average function are the same for all of the first subset of the multiple temporary predictions, or weighed values for the second subset of the multiple temporary predictions used in the weighted average function are the same for all positions for at least one temporary prediction in the second subset, or weighed values at least on one position for the second subset of the multiple temporary predictions used in the weighted average function are the same for all of the second subset of the multiple temporary predictions.

In some embodiments, the multiple temporary predictions are generated by using affine models referring to the same reference picture.

In some embodiments, the multiple temporary predictions are generated by using affine models referring to reference pictures in the same reference list.

In some embodiments, the two temporary predictions referring to reference list 0 and reference list 1 of a bi-prediction candidate already in a candidate list cannot be combined as a combined candidate.

In some embodiments, the second multiple non-affine predictions include one or more of the following: non-affine inter-prediction, intra-prediction, intra-block-copy, inter-layer prediction in scalable video coding, inter-view prediction in multiview video coding or 3D video coding.

In some embodiments, the non-affine inter-prediction includes other sub-block based prediction including ATMVP, STMVP and MVPlanar prediction.

In some embodiments, in a case that the number of the first multiple temporary predictions for the current block is zero, the other sub-block based prediction including ATMVP, STMVP and MVPlanar prediction can be combined with each other.

In some embodiments, for one prediction direction, affine motion is used to derive temporary prediction blocks, and for the other prediction direction, non-affine motion is used to derive temporary prediction blocks.

In some embodiments, an affine flag is signaled for each prediction direction.

In some embodiments, for one prediction direction, both affine motion and non-affine motion are used to derive temporary prediction blocks.

Figure 16:
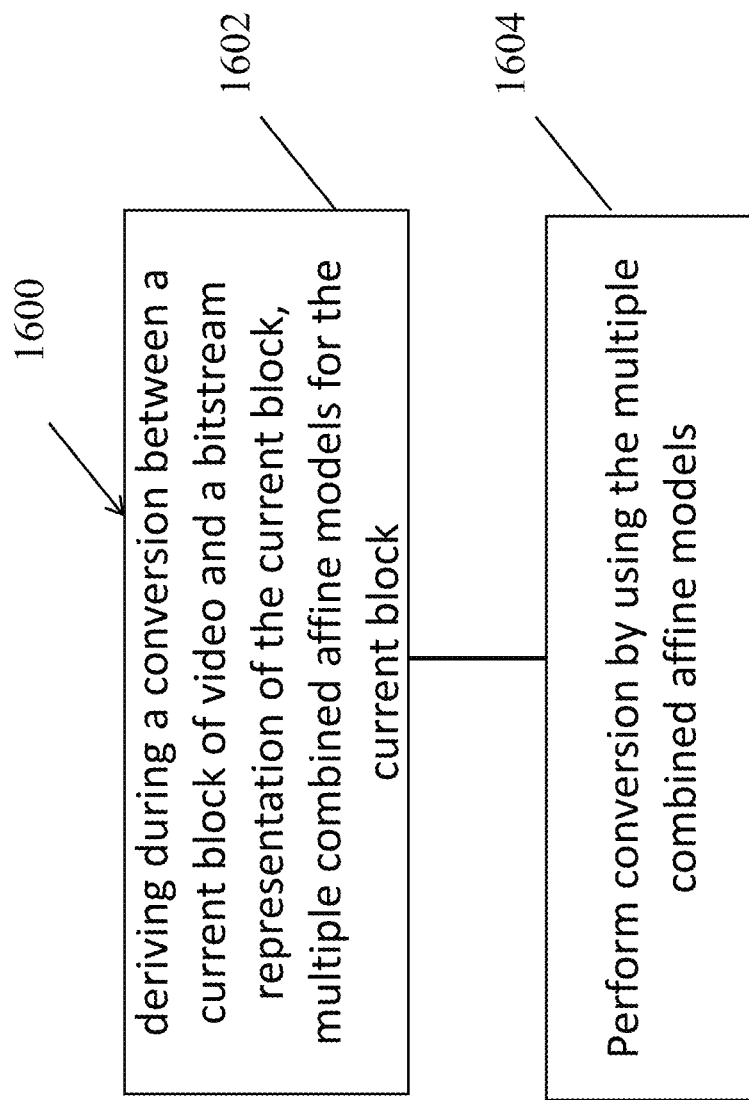
FIG. 16 is a flowchart for another example method of video processing.

FIG. 16 is a flowchart representation of a method 1600 of video coding. The method 1600 includes deriving (1602), during a conversion between a current block of video and a bitstream representation of the current block, multiple combined affine models for the current block; and performing (1604) the conversion by using the multiple combined affine models.

In some embodiments, the multiple combined affine models are used as affine motion vector prediction candidates or merge candidates, and are added into an affine motion vector prediction candidate list or an affine merge list.

In some embodiments, affine parameters or control point motion vectors of each two affine coded spatial neighboring blocks of the current block are combined to derive a combined candidate with the affine parameters or control point motion vectors of the combined affine model.

In some embodiments, temporary predictions generated from the affine models of each two affine coded spatial neighboring blocks are combined to generate the combined candidate with the combined prediction.

In some embodiments, the combined candidate is added into the candidate list after normal affine AMVP or merge candidates derived from spatial neighboring blocks.

In some embodiments, the number of combined candidate added into the candidate list cannot exceed a predetermined threshold number.

In some embodiments, the method further comprising: after performing conversion of the current block, control point motion vectors of the affine models are added into a lookup table in history motion vector prediction.

In some embodiments, a separate control point motion vector lookup table is used to store the control point motion vectors, and an entry in the control point motion vector lookup table stores two or three control point motion vectors coming from an affine coded block.

In some embodiments, number of history motion vector prediction candidates for coding affine coded blocks is fixed.

In some embodiments, number of history motion vector prediction candidates for coding affine coded blocks is adaptively changed based on coded information including block size, block shape, slice type, or based on number of available candidates before adding history motion vector prediction candidates.

In some embodiments, an order to add sub-block-based merge candidates into a sub-block based merge list includes at least one of:
 a. AT→ST→Aff→vAff→Z;
 b. AT→Aff→ST→vAff→Z;
 c. Aff→AT→ST→vAff→Z;
 d. Aff→ST→AT→vAff→Z;
 e. ST→AT→Aff→vAff→Z;
 f. ST→Aff→AT→vAff→Z;
 g. AT→ST→Aff→cAff→vAff→Z;
 h. AT→Aff→ST→cAff→vAff→Z;
 i. Aff→AT→ST→cAff→vAff→Z;
 j. Aff→ST→AT→cAff→vAff→Z;
 k. ST→AT→Aff→cAff→vAff→Z;
 l. ST→Aff→AT→cAff→vAff→Z;
 m. AT→ST→Aff→vAff→cAff→Z;
 n. AT→Aff→ST→vAff→cAff→Z;
 o. Aff→AT→ST→vAff→cAff→Z;
 p. Aff→ST→AT→vAff→cAff→Z;
 q. ST→AT→Aff→vAff→cAff→Z;
 r. ST→Aff→AT→vAff→cAff→Z;
 s. AT→ST→Aff→cAff→Z;
 t. AT→Aff→ST→cAff→Z;
 u. Aff→AT→ST→cAff→Z;
 v. Aff→ST→AT→cAff→Z;
 w. ST→AT→Aff→cAff→Z;
 x. ST→Aff→AT→cAff→Z;
 y. adaptively changed from block to block.
 wherein AT represents advanced temporal motion vector prediction candidate, ST represents spatio temporal motion vector prediction candidate, Aff represents affine merge candidate inherited from an affine coded neighbouring block, vAff represents constructed affine merge candidate, cAff represents combined merge candidate, and Z represents Zero candidate: Z In some embodiments, the order is adaptively changed from block to block.

In some embodiments, the number of sub-block-based merge candidates added into the sub-block based merge list does not exceed a predetermined number.

In some embodiments, the number of affine merge candidate inherited from an affine coded neighboring block does not exceed the predetermined number in a range of 2 to 6.

In some embodiments, the number of constructed affine merge candidate does not exceed the predetermined number in a range of 0 to 6.

In some embodiments, the number of combined merge candidate does not exceed the predetermined number in a range of 0 to 6.

In some embodiments, number of one kind of sub-block-based candidates for coding affine coded blocks is fixed.

In some embodiments, number of one kind of sub-block-based candidates for coding affine coded blocks is adaptively changed based on coded information including block size, block shape, slice type, or based on number of available candidates before adding history motion vector prediction candidates.

In some embodiments, the conversion comprises reconstructing the current block from the bitstream representation.

In some embodiments, the conversion comprises generating the bitstream representation from the current block.

Figure 17:
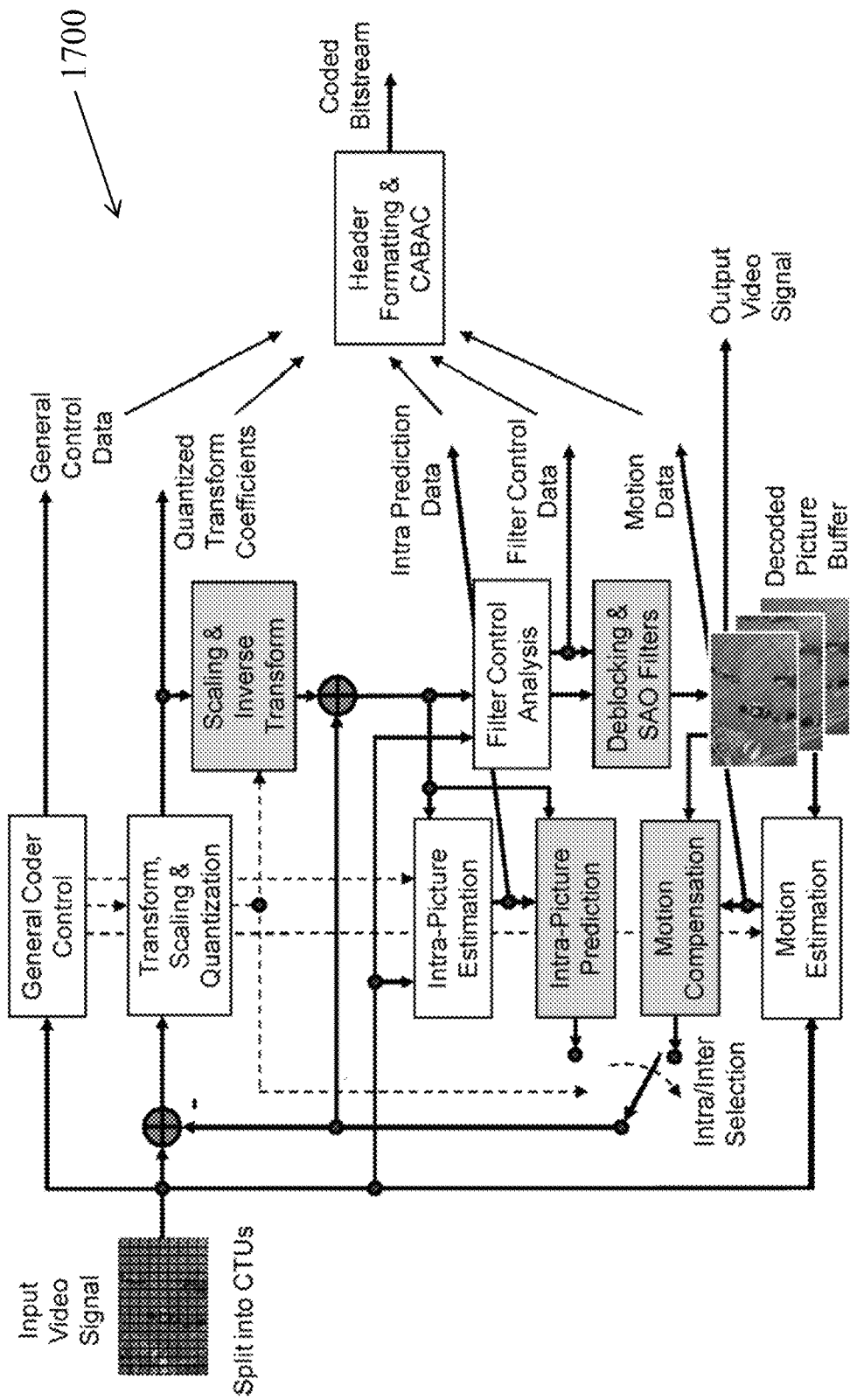
FIG. 17 shows an example block diagram of a typical High Efficiency Video Coding (HEVC) video encoder and decoder.

FIG. 17 shows an example block diagram of a typical HEVC video encoder and decoder 1700. An encoding algorithm producing an HEVC compliant bitstream would typically proceed as follows. Each picture is split into block-shaped regions, with the exact block partitioning being conveyed to the decoder. The first picture of a video sequence (and the first picture at each clean random access point into a video sequence) is coded using only intra-picture prediction (that uses some prediction of data spatially from region-to-region within the same picture, but has no dependence on other pictures). For all remaining pictures of a sequence or between random access points, inter-picture temporally predictive coding modes are typically used for most blocks. The encoding process for inter-picture prediction consists of choosing motion data comprising the selected reference picture and motion vector (MV) to be applied for predicting the samples of each block. The encoder and decoder generate identical inter-picture prediction signals by applying motion compensation (MC) using the MV and mode decision data, which are transmitted as side information.

The residual signal of the intra- or inter-picture prediction, which is the difference between the original block and its prediction, is transformed by a linear spatial transform. The transform coefficients are then scaled, quantized, entropy coded, and transmitted together with the prediction information.

The encoder duplicates the decoder processing loop (see gray-shaded boxes in FIG. 17) such that both will generate identical predictions for subsequent data. Therefore, the quantized transform coefficients are constructed by inverse scaling and are then inverse transformed to duplicate the decoded approximation of the residual signal. The residual is then added to the prediction, and the result of that addition may then be fed into one or two loop filters to smooth out artifacts induced by block-wise processing and quantization. The final picture representation (that is a duplicate of the output of the decoder) is stored in a decoded picture buffer to be used for the prediction of subsequent pictures. In general, the order of encoding or decoding processing of pictures often differs from the order in which they arrive from the source; necessitating a distinction between the decoding order (e.g., bitstream order) and the output order (e.g., display order) for a decoder.

Video material to be encoded by HEVC is generally expected to be input as progressive scan imagery (either due to the source video originating in that format or resulting from deinterlacing prior to encoding). No explicit coding features are present in the HEVC design to support the use of interlaced scanning, as interlaced scanning is no longer used for displays and is becoming substantially less common for distribution. However, a metadata syntax has been provided in HEVC to allow an encoder to indicate that interlace-scanned video has been sent by coding each field (i.e., the even or odd numbered lines of each video frame) of interlaced video as a separate picture or that it has been sent by coding each interlaced frame as an HEVC coded picture. This provides an efficient method of coding interlaced video without burdening decoders with a need to support a special decoding process for it.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
    deriving, during a conversion between a current block of a video and a bitstream of the current block, at least one combined affine model using multiple original affine models with control point motion vectors, wherein each of the at least one combined affine model comprises a first set of control point motion vectors, wherein the multiple original affine models have multiple second sets of control point motion vectors, respectively, and wherein each control point motion vector in the first set of control point motion vectors is a function of corresponding control point motion vectors in each of the multiple second sets of control point motion vectors;
    storing affine model parameters for the current block; and
    performing the conversion based on the affine model parameters,
    wherein the affine model parameters are signaled from an encoder to a decoder,
    wherein the affine model parameters are derived at least from motion vectors of control points of the current block, and
    wherein the conversion is performed without storing the control point motion vectors of the current block.

2. The method of claim 1, wherein a number of stored affine model parameters is based on an affine model.

3. The method of claim 1, wherein the storing the affine model parameters includes storing two or four parameters for a 4-parameter affine model.

4. The method of claim 1, wherein the storing the affine model parameters includes storing four or six parameters for a 6-parameter affine model.

5. The method of claim 1, further comprising storing one of multiple control point motion vectors of the current block.

6. The method of claim 1, wherein the performing the conversion includes deriving affine motion for sub-blocks of the current block from the affine model parameters.

7. The method of claim 1, wherein the performing the conversion includes deriving affine motion for sub-blocks of the current block from the affine model parameters and one of multiple control point motion vectors.

8. The method of claim 7, wherein a number of the affine model parameters used to derive the affine motion for the sub-blocks of the current block is based on an affine model.

9. The method of claim 8, wherein the affine motion for the sub-blocks of the current block is derived as a normalization function based on one of: the affine model parameters, and the affine model parameters adding one of the multiple control point motion vectors.

10. The method of claim 1, wherein the affine model parameters for the current block are predicted from parameters of neighboring affine block.

11. The method of claim 1, wherein one control point motion vector of multiple control point motion vectors is signaled for the current block.

12. The method of claim 11, wherein the one control point motion vector is predicted by a motion vector prediction, and a Motion Vector Difference (MVD) is signaled as a normal motion vector.

13. The method of claim 1, wherein the affine model parameters for the current block are derived from a spatial or temporal neighboring block of the current block.

14. The method of claim 13, wherein one of multiple control point motion vectors is derived from the spatial or temporal neighboring block of the current block.

15. The method of claim 1, wherein the conversion comprises reconstructing the current block from the bitstream.

16. The method of claim 1, wherein the conversion comprises generating the bitstream from the current block.

17. An apparatus in a video system comprising a processor and a non-transitory memory with instructions thereon, wherein the instructions upon execution by the processor, cause the processor to:
    derive, during a conversion between a current block of a video and a bitstream of the current block, at least one combined affine model using multiple original affine models with control point motion vectors, wherein each of the at least one combined affine model comprises a first set of control point motion vectors, wherein the multiple original affine models have multiple second sets of control point motion vectors, respectively, and wherein each control point motion vector in the first set of control point motion vectors is a function of corresponding control point motion vectors in each of the multiple second sets of control point motion vectors;

store affine model parameters for the current block; and perform the conversion based on the affine model parameters, wherein the affine model parameters are signaled from an encoder to a decoder, wherein the affine model parameters are derived at least from motion vectors of control points of the current block, and wherein the conversion is performed without storing the control point motion vectors of the current block.

18. A non-transitory computer-readable recording medium storing a bitstream of a video which is generated by a method performed by a video processing apparatus, wherein the method comprises:

deriving, for a current block of the video, at least one combined affine model using multiple original affine models with control point motion vectors, wherein each of the at least one combined affine model comprises a first set of control point motion vectors, wherein the multiple original affine models have multiple second sets of control point motion vectors, respectively, and wherein each control point motion vector in the first set of control point motion vectors is a function of corresponding control point motion vectors in each of the multiple second sets of control point motion vectors;

storing affine model parameters for the current block; and generating the bitstream from the current block based on the affine model parameters, wherein the affine model parameters are signaled from an encoder to a decoder, wherein the affine model parameters are derived at least from motion vectors of control points of the current block, and wherein the generating is performed without storing control point motion vectors of the current block.

\* \* \* \* \*

UNITED STATES PATENT AND TRADEMARK OFFICE
CERTIFICATE OF CORRECTION

| | | |
|---|---|---|
| PATENT NO. | : 11,909,953 B2 | |
| APPLICATION NO. | : 17/193397 | |
| DATED | : February 20, 2024 | |
| INVENTOR(S) | : Kai Zhang et al. | |

It is certified that error appears in the above-identified patent and that said Letters Patent is hereby corrected as shown below:

In the Claims

In Column 30, Line 21, in Claim 18, delete "wherein the generating is performed without storing control point motion vectors of the current block." and insert -- wherein the generating is performed without storing the control point motion vectors of the current block. --, therefor.

Signed and Sealed this
Eleventh Day of June, 2024

Katherine Kelly Vidal
*Director of the United States Patent and Trademark Office*